United States Patent [19]
Torikai et al.

[11] Patent Number: 6,026,194
[45] Date of Patent: Feb. 15, 2000

[54] APPARATUS AND METHOD OF IMAGE COMPRESSION AND DECOMPRESSION NOT REQUIRING RASTER BLOCK AND BLOCK RASTER TRANSFORMATION

[75] Inventors: Yuji Torikai; Masaaki Tanioka; Narihiro Matoba, all of Hyogo, Japan

[73] Assignee: Mitsubishi Denki Kabushiki Kaisha, Tokyo, Japan

[21] Appl. No.: 08/969,017

[22] Filed: Nov. 12, 1997

[30] Foreign Application Priority Data

May 20, 1997 [JP] Japan ..................................... 9-129984

[51] Int. Cl.[7] ....................................................... G06K 9/36
[52] U.S. Cl. .......................... 382/232; 382/235; 386/112
[58] Field of Search ................... 382/232, 235; 386/112

[56] References Cited

U.S. PATENT DOCUMENTS

| | | | |
|---|---|---|---|
| 5,298,997 | 3/1994 | Manabe | 348/441 |
| 5,453,786 | 9/1995 | Trent | 348/384 |
| 5,500,577 | 3/1996 | Kim et al. | 315/364 |
| 5,636,316 | 6/1997 | Oku et al. | 386/112 |

FOREIGN PATENT DOCUMENTS

| | | | |
|---|---|---|---|
| 5-252500 | 9/1993 | Japan | H04N 7/133 |
| 08046797 | 2/1996 | Japan | H04N 1/415 |

*Primary Examiner*—Jose L. Couso
*Assistant Examiner*—Anh Hong Do
*Attorney, Agent, or Firm*—McDermott, Will & Emery

[57] ABSTRACT

When image data of the first line is input, compressor 102 compresses the input image data by every prescribed number of pixels corresponding to the number of pixels included in column direction of one block, and the compressed data is stored in the corresponding region of a memory 104, under the control of control circuit 108. For the second and following lines, the compressed data of the last line which has been compressed and stored in the memory 104 and the input data are received by the compressor 102, and the compressor 102 integrates and compresses the received data, and the compressed result is stored in the corresponding memory region of the memory 104.

6 Claims, 24 Drawing Sheets

WHEN PIXEL DATA 1~4 ARE INPUT

WHEN PIXEL DATA 5~8 ARE INPUT

WHEN PIXEL DATA N+1~N+4 ARE INPUT

WHEN PIXEL DATA N+5~N+8 ARE INPUT

WHEN PIXEL DATA 2N+1~2N+4 ARE INPUT

FBTC COMPRESSION (COMPRESSION RATIO 8/3)

FBTC COMPRESSION (COMPRESSION RATIO 2)

WHEN PIXEL DATA 1~4 ARE INPUT

WHEN PIXEL DATA 5~8 ARE INPUT

WHEN PIXEL DATA N+1~N+4 ARE INPUT

WHEN PIXEL DATA N+5~N+8 ARE INPUT

WHEN PIXEL DATA 2N+1~2N+4 ARE INPUT

OUTPUT PIXEL DATA 1~4

OUTPUT PIXEL DATA 5~8

OUTPUT PIXEL DATA N+1~N+4

OUTPUT PIXEL DATA N+5~N+8

OUTPUT PIXEL DATA 2N+1~2N+4

OUTPUT PIXEL DATA 1~4

COMPRESSED DATA
OF 1ST BLOCK
STORED IN MEMORY

| 1 | 2 | 3 | 4 |
|---|---|---|---|
| N+1 | N+2 | N+3 | N+4 |
| 2N+1 | 2N+2 | 2N+3 | 2N+4 |
| 3N+1 | 3N+2 | 3N+3 | 3N+4 |

DECOMPRESSION

| 1 | 2 | 3 | 4 |
|---|---|---|---|

EXTRACT & OUTPUT
IMAGE DATA 1~4

OUTPUT PIXEL DATA 5~8

COMPRESSED DATA
OF 2ND BLOCK
STORED IN MEMORY

| 5 | 6 | 7 | 8 |
|---|---|---|---|
| N+5 | N+6 | N+7 | N+8 |
| 2N+5 | 2N+6 | 2N+7 | 2N+8 |
| 3N+5 | 3N+6 | 3N+7 | 3N+8 |

DECOMPRESSION

| 5 | 6 | 7 | 8 |
|---|---|---|---|

EXTRACT & OUTPUT
IMAGE DATA 5~8

FIG. 39
OUTPUT PIXEL DATA N+1～N+4
COMPRESSED DATA OF 1ST BLOCK STORED IN MEMORY
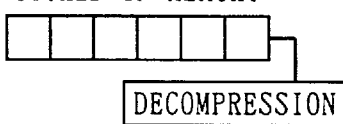
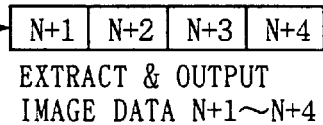
EXTRACT & OUTPUT IMAGE DATA N+1～N+4
FIG. 40
OUTPUT PIXEL DATA N+5～N+8
COMPRESSED DATA OF 2ND BLOCK STORED IN MEMORY
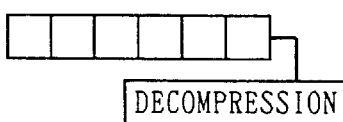
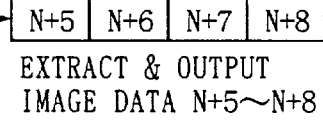
EXTRACT & OUTPUT IMAGE DATA N+5～N+8
FIG. 41
OUTPUT PIXEL DATA 2N+1～2N+4
COMPRESSED DATA OF 1ST BLOCK STORED IN MEMORY
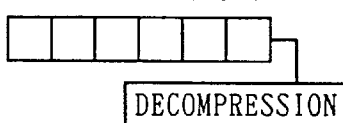
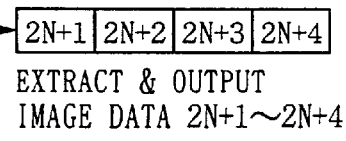
EXTRACT & OUTPUT IMAGE DATA 2N+1～2N+4

OUTPUT PIXEL DATA 2N+5~2N+8

EXTRACT & OUTPUT
IMAGE DATA 2N+5~2N+8

OUTPUT PIXEL DATA 3N+1~3N+4

EXTRACT & OUTPUT
IMAGE DATA 3N+1~3N+4

OUTPUT PIXEL DATA 3N+5~3N+8

EXTRACT & OUTPUT
IMAGE DATA 3N+5~3N+8

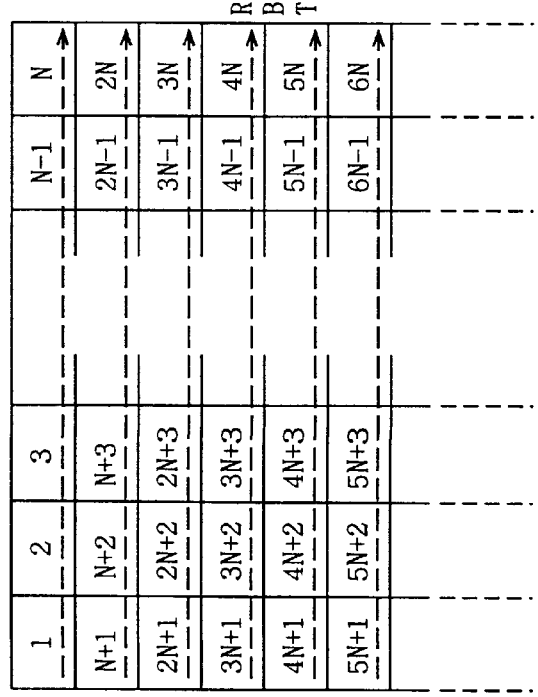

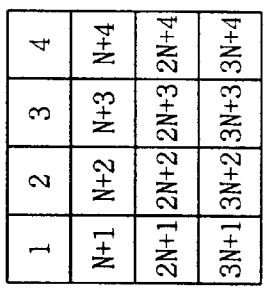
FIG. 50B BLOCK 1
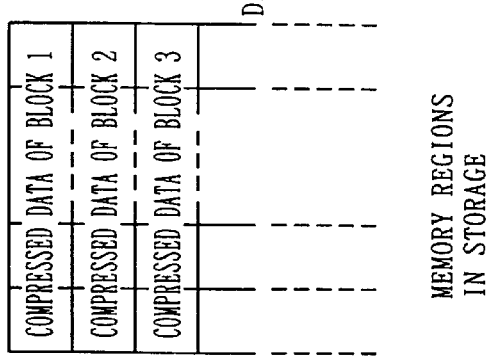
FIG. 50A — MEMORY REGIONS IN STORAGE
FIG. 50C BLOCK 2 DECOMPRESSED DATA
FIG. 50D OUTPUT IMAGE DATA
DECOMPRESSION → BLOCK RASTER TRANSFORMATION →

APPARATUS AND METHOD OF IMAGE COMPRESSION AND DECOMPRESSION NOT REQUIRING RASTER BLOCK AND BLOCK RASTER TRANSFORMATION

BACKGROUND OF THE INVENTION

1. Field of the Invention

The present invention relates to an image processing apparatus, method of image data compression and method of image data decompression by which image data can be subjected to fixed length code compression without raster•block transformation to be stored in the memory, and fixed length coded compressed data corresponding to the image data stored in the memory can be subjected to fixed length decompression without block-raster transformation.

1. Description of the Background Art

As more and more image data come to be digitized, hard copy apparatuses such as printers and copying machines come to be required of various image editing and image processing functions. Conventionally, various methods of data compression have been proposed in order to make compact the volume of image data. At present, JPEG (Joint Photographic Coding Experts Group) method, which is now becoming an international standard, is dominant. The JPEG method is capable of efficiently compressing natural image, and the performance is highly appreciated. This method utilizes the nature that when digital image data is compressed, adjacent image data is, especially in natural images, similar to each other, and in this method, compression is performed block by block, with each block having 8 columns×8 rows of pixels.

However, as will be described later, there are functions and characteristics required for the hard copying apparatuses and the like which cannot be sufficiently addressed by the JPEG method. FBTC (Fixed Block Truncation Coding) method, for example, has been proposed as a method of image data compression for such applications.

In the FBTC method, image data is compressed block by block, each block having pixels of 4 columns×4 rows. Namely, generally, image data compression is performed on the basis of a block unit having pixels of X columns×Y rows, utilizing the nature that adjacent image data are similar to each other.

When image data compression is applied to a hard copy apparatus, for example, at least the following conditions must be satisfied.

① High image quality can be maintained not dependent on the type of the image.

② The method is of the type of fixed length coding.

③ High speed processing is possible.

The first condition is derived from the fact that in a hard copy apparatus or the like, high definition images such as computer graphics and character images of which degradation of image quality is much noticed, are often handled, other than the natural images.

The second condition derives from the fact that in order to implement editing function such as magnification, rotation, cut and paste of the images, fixed length coding method which allows easy management of data position even in the compressed state is preferable.

The third condition derives from the fact that real time image compression and decompression is required which corresponds to the high speed processing at the recording portion of the hard copy apparatus or the like.

As will be described in the following, FBTC method is one of the fixed length code image compression and decompression which satisfies the aforementioned conditions. In the FBTC method, the image data is divided into block size of 4×4, and compression is performed on the following three components separately.

① Average level of image data (density value) in the block.

② Tone width index in the block

③ Quantization level of each pixel

When the compression ratio is 8/3 (the data size after compression is 3/8), the average level and the tone width index of the block have 8 bits, respectively, and quantization level of each image has 2 bits for 16 pixels, that is, a total of 32 bits.

By changing quantization level, input signal system and so on, it is possible to select any of fixed length modes having the compression ratio of 2, 8/3, 4, and 16/3.

Since the FBTC method compresses or decompresses image data based on the above described algorithm, it has the following characteristics.

① Image quality of not only natural images but also high definition images including computer graphics images and characters is not much degraded.

② Since it is the fixed length coding method, it allows easy edition of images in the compressed state.

③ Algorithm is simple, allowing implementation in a small scale hardware.

④ High speed processing is possible.

Though the method of image data compression or decompression in accordance with the FBTC method has the above described advantages, it suffers from the following problem when the input image data transmitted serially and successively starting from the first line, such as digital signals obtained from an image sensor such as a CCD (Charge Coupled Device) are to be compressed.

More specifically, the method requires rasterblock transformation for converting the serially transmitted flow of image data to the flow of image data in the unit of a block.

FIG. 46 is a schematic block diagram showing a structure of a conventional image compressing apparatus 1000.

The conventional image compression apparatus 1000 includes a raster•block transformer 1002 receiving image data input line by line and converting and outputting the received data to data of blocks each having x columns×Y rows (for example, 4 columns×4 rows), a compressor 1004 receiving the data which has been transformed to blocks, performing prescribed image compression on each block and outputting compressed data, and a memory 1006 for storing and holding the compressed data in memory regions allotted to respective blocks.

FIG. 47 illustrates the concept of operation of the image compression apparatus 1000 shown in FIG. 46.

The image data is divided into N columns. Each pixel data is successively input serially line by line in the order of 1, 2, . . . , N−1, N, N+1, . . . , 2N−1, 2N, 2N+1, . . . to raster•block transformer 1002.

Raster•block transformer 1002 outputs block data of 4 rows and 4 columns including pixel data of 1, 2, 3, 4, N+1, N+2, . . . , 2N+3, 3N+4 as the first image data block, for the first four rows of image data.

Receiving the first block data, compressor 1004 performs image data compression and outputs the result to memory 1006. In memory 1006, compressed data is stored in the memory region allotted to the data of the first block.

Thereafter, in the similar manner, raster•block transformer 1002 outputs to compressor 1004 an image data block of 4 columns×4 rows including pixels 5, 6, 7, 8, N+5, N+6, . . . , 3N+7, 3N+8 of the first four rows of data. The image data compressed by compressor 1004 is stored in the memory region allotted to the second block, of memory 1006.

Thereafter, in the similar manner, when compression of image data of the first four rows is completed, the data of the next four rows are transformed to blocks, compressed block by block, and stored in memory 1006.

FIG. 46 is a schematic block diagram showing the structure of the raster•block transformer 1002 shown in FIG. 46.

Raster•block transformer 1002 includes Y (in the example of FIG. 47, four) FIFO memories (First-In-First-Out Memory) 1200a to 1200d, and a switching circuit 1100 receiving image data transmitted externally line by line, for switching and outputting the data line by line to FIFO memories 1200a to 1200d successively.

More specifically, of the image data transmitted line by line, line of pixel data 1 to N is input to the first FIFO memory 1200a, the line of pixel data N+1 to 2N is input to the second FIFO memory 1200b, the line of pixel data 2N+1 to 3N is input to the third FIFO memory 1200c, and the line of pixel data 3N+1 to 4N is input to the fourth FIFO memory 1200d. Thereafter, from the four FIFO memories 1200a to 1200d, pixel data are output simultaneously on the basis of X pixels, and data in a block unit are output.

When the data compressed block by block are to be decompressed to the original image data, the image data are output block by block. When such image data are to be transmitted to an equipment such as a printer, the data must be transformed to data on line unit basis. Accordingly, in that case, block•raster transformation is necessary.

FIG. 49 is a schematic block diagram showing a structure of the conventional image decompression apparatus 2000.

Image decompression apparatus 2000 includes a memory 1006 holding the compressed image data, a decompressor 1008 successively reading data held in memory 1006 for performing image data decompression, and a block•raster transformer 1010 for transforming image data in blocks to data in lines for output.

FIG. 50 is an illustration showing the concept of operation of image decompression apparatus 2000 shown in FIG. 49.

When compressed data of the first block held in memory 1006 is read by decompressor 1008 and decompressed, the image data is transformed to pixel data 1, 2, 3, 4, N+1, N+2, . . . , 3N+3, 3N+4 which correspond to image data of 1 block having 4 columns×4 rows, and output to block.raster transformer 1010.

Thereafter, decompressor 1008 decompresses compressed image data of the second block held in memory 1006, transforms the data to pixel data 5, 6, 7, 8, N+5, N+6, . . . , 3N+7, 3N+8 of 1 block, and outputs the pixel data to block•raster transformer 1010. When decompressor 1008 successively repeats the above described processing and pixel data of the first four lines of the image data are all decompressed, image data are output line by line from block•raster transformer 1010.

Thereafter, compressed image data of the next four lines held in memory 1006 are decompressed by decompressor 1008, and data of pixel blocks which are the result of image data decompression block by block are output to block•raster transformer 1010, so that image data of the succeeding four lines are output line by line.

More specifically, from block•raster transformer 1010, following the data of the first line including pixel data 1, 2, . . . , N−1 and N, the data of the second line including pixel data N+1, . . . , 2N−1 and 2N are output, and in this manner, image data are output line by line.

FIG. 51 is a schematic block diagram showing the structure of the block•raster transformer shown in FIG. 49.

Referring to FIG. 51, block•raster transformer 1010 includes Y (in the example shown in FIG. 50, four) FIFO memories 1300a to 1300d receiving image data in the form of blocks output from decompressor 1008, and a switching circuit 1400 for successively switching and outputting line by line the output data from FIFO memories 1300a to 1300d.

More specifically, block•raster transformer 1010 receives, of the pixel data of respective blocks output from decompressor 1008, the data of the first line at the first FIFO memory 1300a, the data of the second line at the second FIFO memory 1300b, the data of the third line at the third FIFO memory 1300c and the data of the fourth line at the fourth FIFO memory 1300d, and after the end of input of all the blocks of data corresponding to four lines, outputs data successively starting from the first FIFO memory 1300a. Therefore, from block•raster transformer 1010, the data of the first line including pixel data 1, 2, . . . , N−1 and N are output, thereafter image data of the second line including pixel data N+1, . . . , 2N−1 and 2N are output, and thereafter image data are output line by line successively.

In this manner, the conventional image compression apparatus 1000 includes raster•block transformer 1002 and compressor 1004, while the image decompression apparatus 2000 includes decompressor 1008 and block•raster transformer 1010.

However, Y lines of FIFO memories (for an image having the size of VGA, 1 line consists of 640 pixels) are necessary for each of the raster•block transformer 1002 and block•raster transformer 1010, which memories are expensive, hindering reduction in cost of image processing apparatuses such as the image compression apparatus and the image decompression apparatus.

SUMMARY OF THE INVENTION

An object of the present invention is to provide an image processing apparatus for performing image data compression in which necessity of raster•block transformation is eliminated and of which manufacturing cost can be reduced.

Another object of the present invention is to provide an image processing apparatus in which block•raster transformation is unnecessary in performing image data decompression and of which manufacturing cost can be reduced.

A still further object of the present invention is to provide a method of data compression in which raster•block transformation is unnecessary in performing image data compression, enabling image data compression by a simple structure.

A still further object of the present invention is to provide a method of image data decompression in which block•raster transformation is unnecessary in decompressing image data, enabling image data decompression by a simple structure at a low cost.

In summary, the present invention is directed to an image processing apparatus in which image data is divided into Mb×Nb blocks arranged in Mb rows and Nb columns with each block having p×p pixels, for performing fixed length code data compression on each block (where p, Mb and Nb are positive integers), including a control circuit, a data compression circuit, a storage circuit and a data decompression circuit.

The control circuit controls image compression by the image processing apparatus. The data compression circuit receives first data of p pixels corresponding to one row of the block of image data successively applied externally line by line and second data applied controlled by the control circuit and performs fixed length code data compression on data resulting from integration of the first and second data. The storage circuit receives outputs from the data compression circuit and stores the compressed data in memory regions allotted corresponding to respective ones of Mb×Nb blocks in accordance with which block the compressed data belongs to. The data decompression circuit receives data which has been subjected to fixed length code data compression and stored in the corresponding memory region of the storage circuit in accordance with to which block the first data input to the data compression circuit belongs to, performs fixed length code data decompression and applies the resulting data as the second data to data compression circuit, under the control of the control circuit.

According to another aspect, the present invention relates to an image processing apparatus in which image data is divided into Mb×Nb blocks arranged in Mb rows and Nb columns with each block having p×p pixels, each block of data is subjected to fixed length code data compression and the data is decompressed to be output as image data line by line (where p, Mb and Nb are positive integers) which apparatus includes a control circuit, a storage circuit and a data reading circuit.

The control circuit controls image data decompression by the image processing apparatus. The storage circuit stores the pixel data of each block in accordance with to which block the data compressed line by line including p pixels of data belong to, in memory regions allotted corresponding to respective ones of Mb×Nb blocks. The data reading circuit reads the data stored in the storage circuit while successively scanning the memory regions corresponding to the blocks in the row direction of the blocks, performs fixed length code data decompression and successively outputs image data belonging to one line under the control of the control circuit.

Therefore, a main advantage of the present invention is that raster•block transformer is not necessary in performing image data compression, whereby image data compression is possible by a simple structure and manufacturing cost can be reduced.

Another advantage of the present invention is that a block•raster transformer is not necessary in performing image data decompression, whereby image data decompression is possible by a simple structure and the manufacturing cost can be reduced.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIGS. 37 to 44 are first to eighth illustrations showing the concept of operation of image decompression apparatus 400.

FIGS. 47A to 47D are illustrations showing the concept of image compression.

FIGS. 50A to 50D are illustrations showing the concept of image decompression.

DESCRIPTION OF THE PREFERRED EMBODIMENTS

First Embodiment

Figure 1:
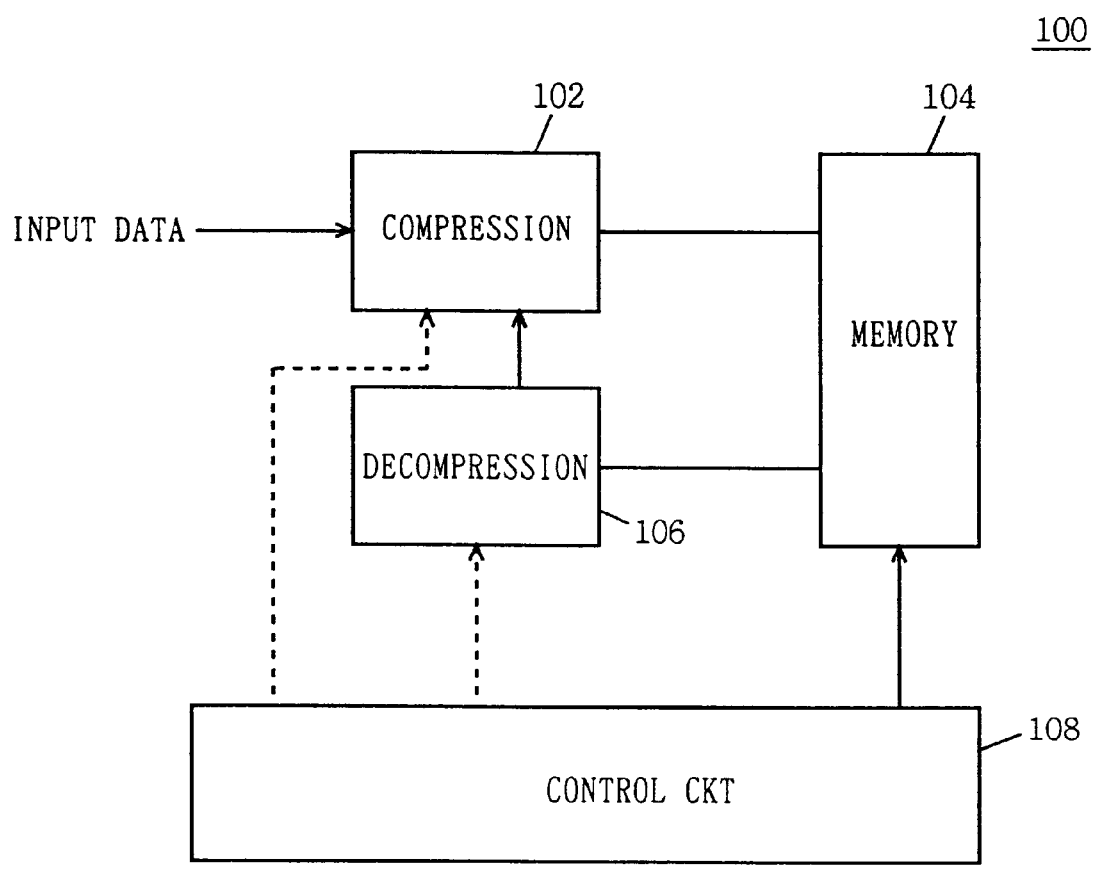
FIG. 1 is a schematic block diagram showing a structure of image compression apparatus 100 in accordance with a first embodiment of the present invention.

FIG. 1 is a schematic block diagram showing the structure of image compression apparatus 100 in accordance with the first embodiment of the present invention. Image compression apparatus 100 includes: a control circuit 108 controlling image compression operation; a compression circuit 102 receiving image data externally input line by line serially and successively, and image data applied from a decompression circuit 106 under the control of control circuit 108, which will be described later, for integrating both image data, performing image data compression and outputting the result; a memory 104 receiving outputs from compression circuit 102 and storing the input compressed data in correspondingly allotted memory regions, in accordance with which image block of the image data the input compressed data corresponds to; and a decompression circuit 106 for reading compressed data stored in the memory region corresponding to that block to which image data presently input to the compression circuit 102 belongs, out of the compressed data stored in memory 104 in accordance with which line of the image block the data input to the compression circuit 102 belongs to, performing image data decompression and applies the decompressed data to compression circuit 102, under the control of control circuit 108.

In the following, image data compression and image data decompression in compression circuit 102 and decompression circuit 106 are assumed to be fixed length code data compression or fixed length code data decompression in accordance with but not limited to the FBTC method.

Figure 2:
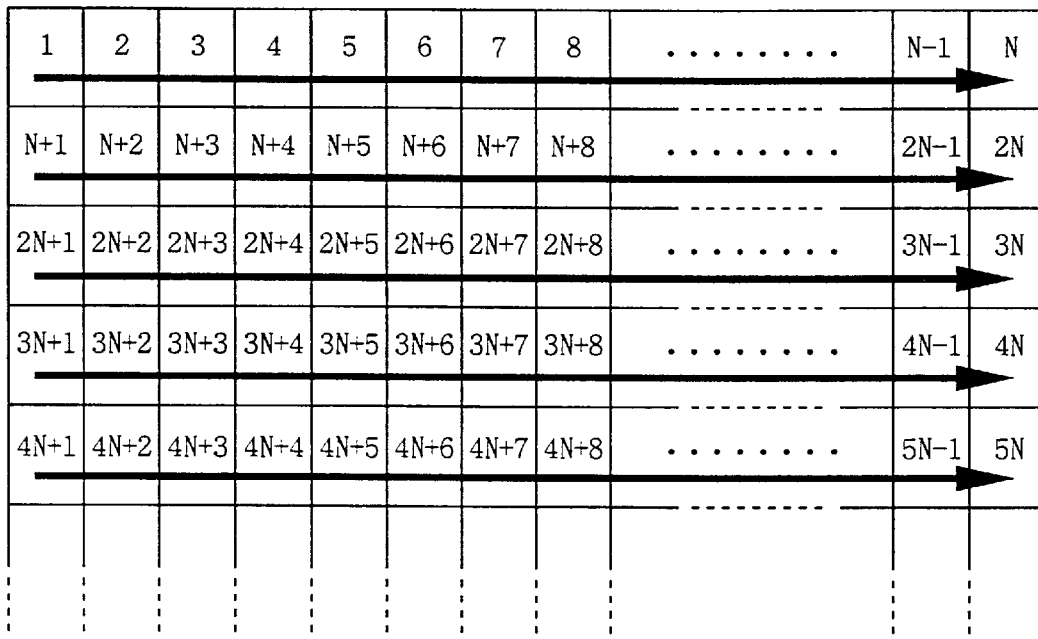
FIG. 2 is a schematic diagram showing concept of block division of the original image.

FIG. 2 shows the concept of image data configuration input to image compression apparatus 100.

It is assumed that image data consists of N columns of pixel data and, as shown by the arrow in FIG. 2, pixel data 1, 2, 3, . . . , N−1 and N are applied as the first line of data to image compression apparatus 100.

Thereafter, the second line of pixel data N+1, N+2, N+3, . . . , 2N−1 and 2N are applied to image compression apparatus 100 and, in the similar manner, pixel data constituting the image data are successively applied line by line to image compression apparatus 100.

FIGS. 3 to 10 are illustrations showing the operation of image compression apparatus 100 shown in FIG. 1.

As will be described in the following, the image data compression performed by image compression apparatus 100 shown in FIG. 1 does not use a raster•block transformer. Instead, image data input line by line serially are compressed and decompressed repeatedly, and finally the data is compressed block by block and stored in the memory 104.

In the example described below, the image data will be subjected to image compression such that the original image data is divided into blocks of a small area each having 4×4 pixels, and each block is compressed with the compression ratio of 8/3 in accordance with the FBTC method.

Figure 3:
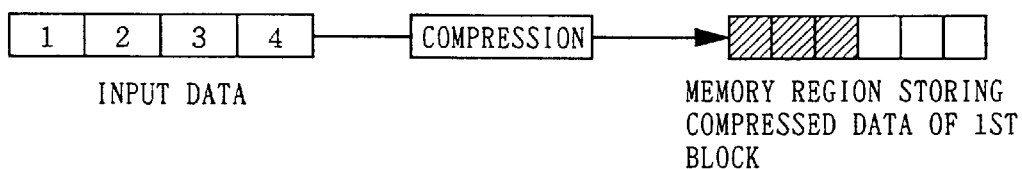
FIGS. 3 to 10 are first to eighth illustrations showing the concept of operation of image compression apparatus 100 in accordance with the first embodiment of the present invention.

Referring to FIG. 3, in image compression apparatus 100, when the first line of data of the original image data are input, compression circuit 102 compresses data of the first block (pixel data 1 to 4) and stores the compressed data in that memory region which is allotted to store the compressed data of the first block in memory 104.

Figure 4:
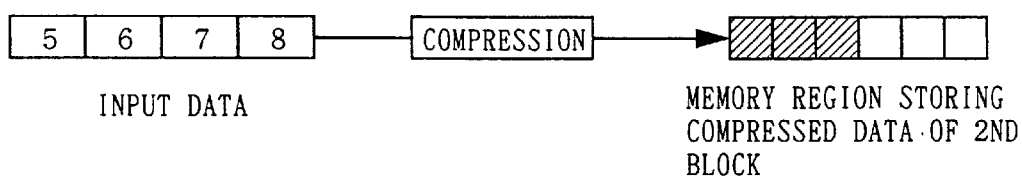

Thereafter, referring to FIG. 4, when the second block (pixel data 5 to 8) is input, compression circuit 102 compresses the input data in the similar manner and stores the compressed data to that memory region which is allotted to store the compressed data of the second block.

Thereafter, similar processes are repeated for all the remaining data (pixel data 9 to N) of the first line of the input data.

Figure 5:
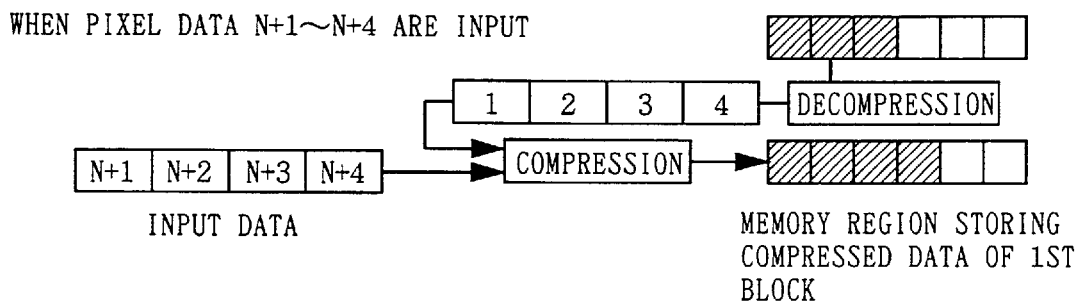

Thereafter, referring to FIG. 5, when the data of the second line of the original image data are input, in image compression apparatus 100, decompression circuit 106 reads the compressed data corresponding to the first block of the first line stored in the memory in the step shown in FIG. 3, for the input data of the first block, decompresses the data and outputs the decompressed data to compression circuit 102.

Compression circuit 102 compresses two lines of data including the output from decompression circuit 106 and the second line of data (pixel data N+1 to N+4), and stores the compressed data in the memory region which is allotted to the compressed data of the first block of memory 104.

Figure 6:
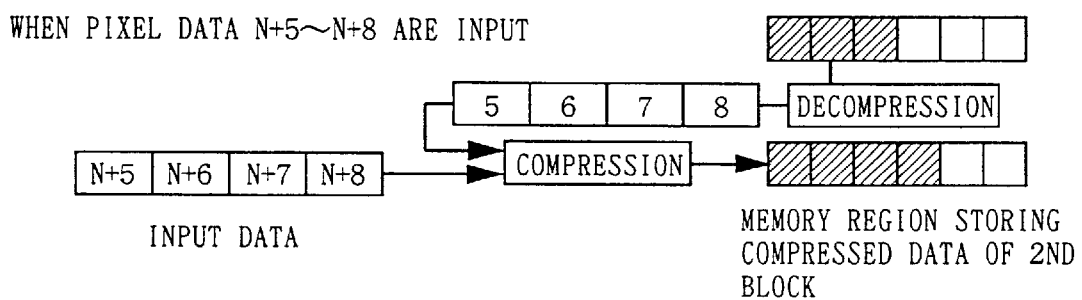

Thereafter, referring to FIG. 6, when the second block of the second line of data is input, decompression circuit 106 reads the compressed data corresponding to the second block of the first line stored in memory 104 in the step shown in FIG. 4, decompresses the read data and outputs the read data to compression circuit 102.

Compression circuit 102 compresses two lines of data including the output from decompression circuit 106 and the input second line of data (pixel data N+5 to N+8), and stores the compressed data in memory region allotted to the compressed data of the second block in memory 104.

Thereafter, image compression apparatus 100 performs similar processes on all the remaining data (pixel data N+9 to 2N) of the second line of the input data.

Figure 7:
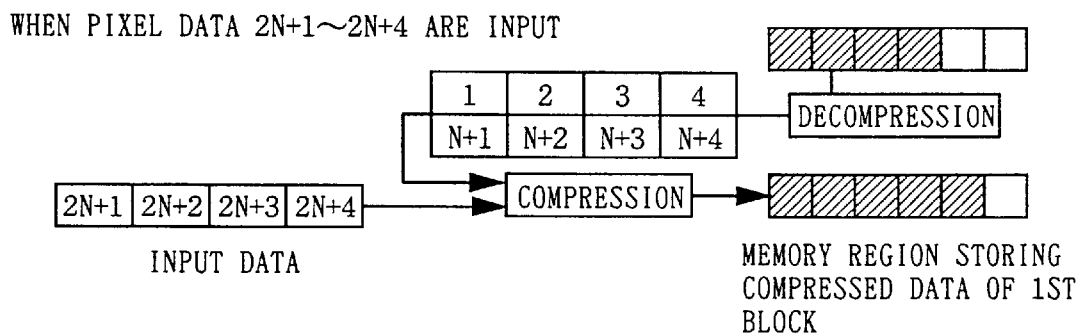

Further, referring to FIG. 7, when the third line of the original image data is input, decompression circuit 106 reads and decompresses data stored in memory 104 in the step of FIG. 5 for the data of the first block, and outputs the decompressed result to compression circuit 102. Compression circuit 102 compresses data of three lines including the output from decompression circuit 106 and the external data of the third line (pixel data 2N+1 to 2N+4), and stores the compressed data in the memory region allotted to the compressed data of the first block in memory 104.

Figure 8:
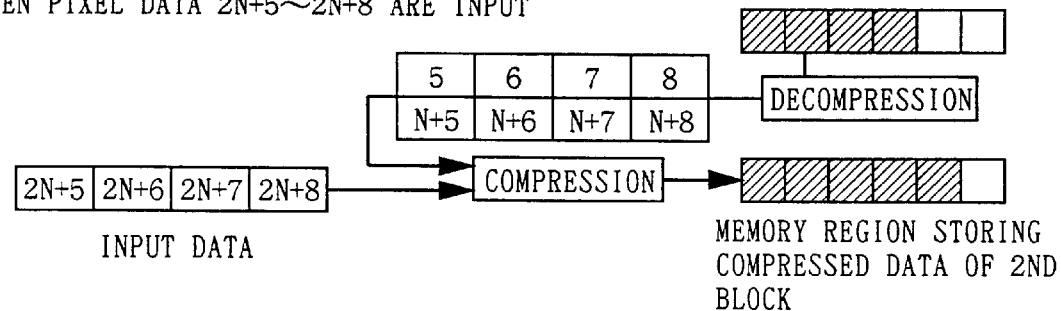

Thereafter, referring to FIG. 8, when image data of the second block of the third line are input, the data of the second block stored in memory 104 in the step of FIG. 6 are decompressed and output by decompression circuit 106, and compression circuit 102 compresses a total of three lines of data including the result of decompression and the data of the second block of the third line externally input (pixel data 2N+5 to 2N+8), and stores the compressed data in the memory region allotted to the compressed data of the second block in memory 104.

Thereafter similar processes are performed on all the remaining data (pixel data 2N+9 to 3N) of the third line of the input data.

Figure 9:
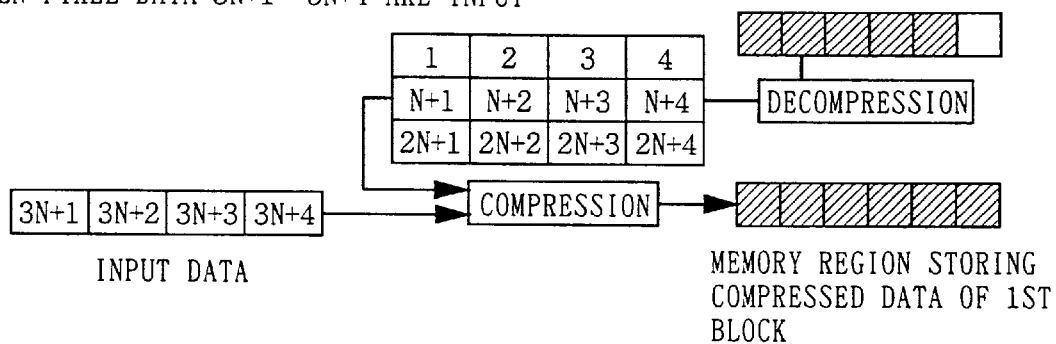

Thereafter, referring to FIG. 9, when the fourth line of image data is input, decompression circuit 106 reads and decompresses data stored in memory 104 in the step shown in FIG. 7 for the first block of data, and outputs the decompressed data to compression circuit 102. Compression circuit 102 compresses image data of four lines including data from decompression circuit 106 and the fourth line of data externally applied (pixel data 3N+1 to 3N+4), and stores the compressed data in the memory region allotted for the compressed data of the first block in memory 104.

Figure 10:
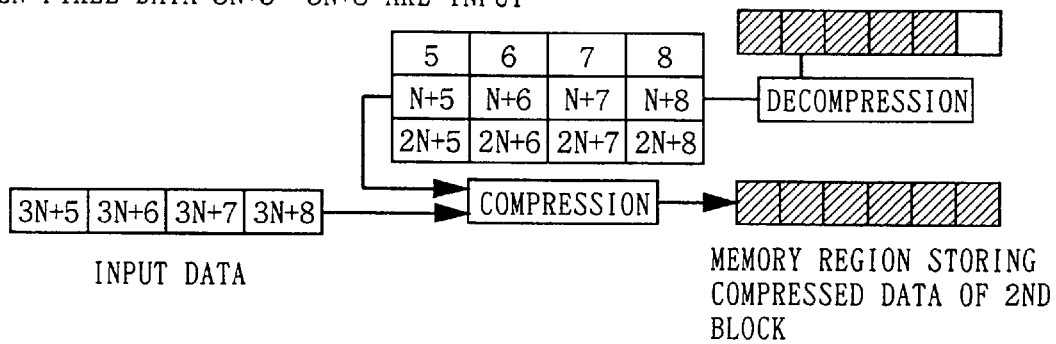

Thereafter, referring to FIG. 10, when the image data of the second block of the fourth line are input, decompression circuit 106 reads and decompresses data stored in memory 104 in the step of FIG. 8, and outputs the decompressed data to compression circuit 102. Compression circuit 102 compresses four lines of image data including the decompressed image data and the data of the fourth line externally input (pixel data 3N+5 to 3N+8), and stores the compressed data in the memory region allotted for the compressed data of the second block in memory 104.

Thereafter, similar processes are performed on all the remaining data (pixel data 3N+9 to 4N) of the fourth line of the input data (FIG. 10).

The above described processes are repeated for every four lines of image data, and the image data corresponding to one image plane are compressed.

By such processing, an image processing apparatus which performs fixed length compression of image data can be implemented without using a raster•block transformer, and manufacturing cost thereof can be reduced.

Figure 11:
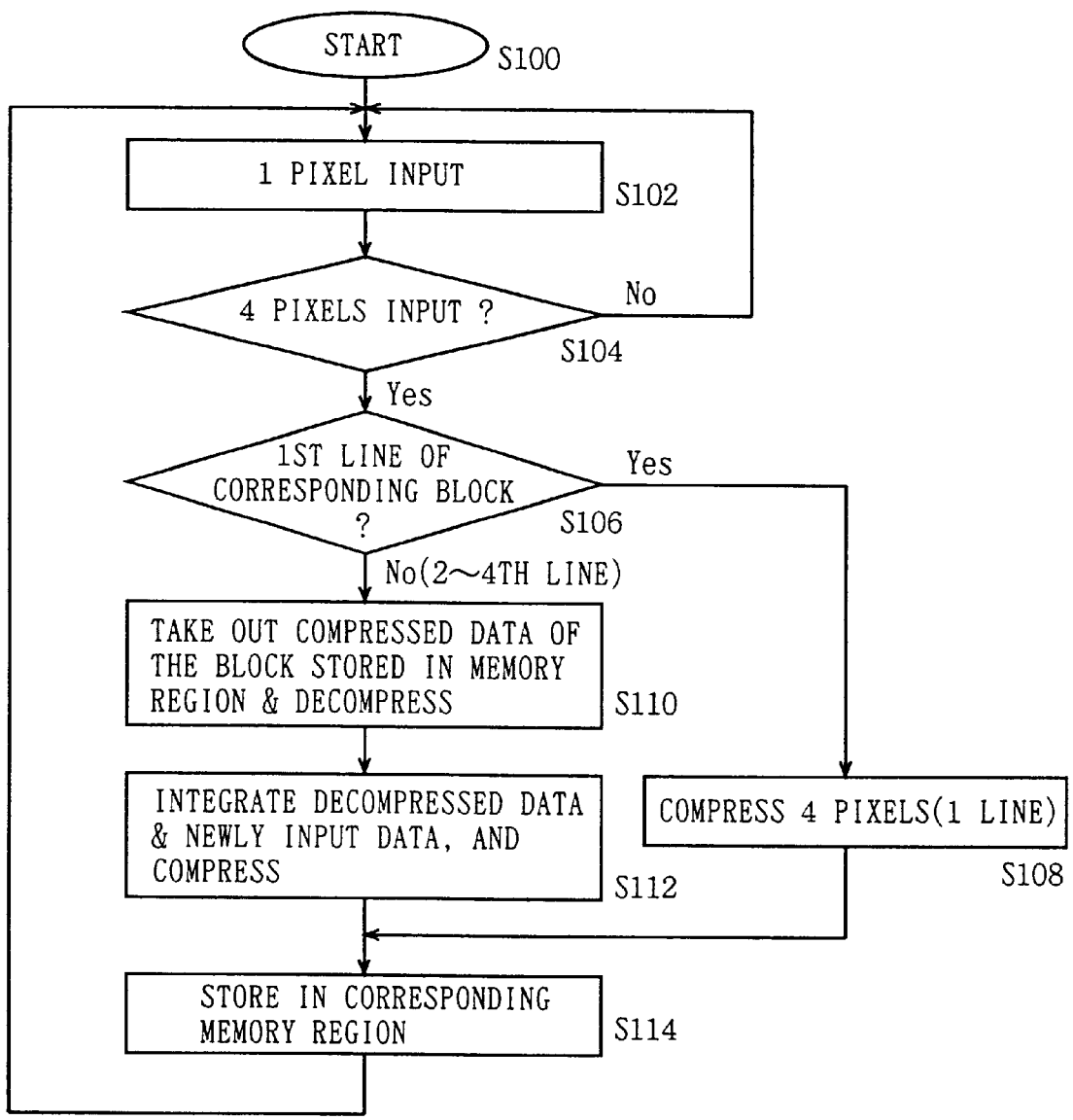
FIG. 11 is a flow chart showing the method of image compression in accordance with the first embodiment.

FIG. 11 is a flow chart showing the flow of fixed length code data compression shown in FIGS. 3 to 10.

When the process starts (step S100), image compression apparatus 100 first receives externally, as input, image data of one pixel at compression circuit 102 (S102).

Thereafter, control circuit 108 determines whether input of four pixels of image data has been completed or not (step S104).

When it is determined that input of four pixels of image data has not yet been completed (step S104), control circuit 108 returns the process again to step S102.

Meanwhile, when it is determined that input of four pixels of image data has been completed (step S104), control circuit 108 determines whether or not the currently input data corresponds to the first line of the corresponding block which is being input (step S106).

When it is determined that the data which is being input is the first line of data of the corresponding block (step S106), control circuit 108 controls compression circuit 102 such that compression circuit 102 compresses the image data of the input four pixels (step S108).

Thereafter, compression circuit 102 stores the data resulting from compression in that memory region of memory 104 which is allotted corresponding to the block which has been subjected to compression.

Thereafter, the process returns to step S102 and compression of successively input image data is performed.

When it is determined that the input image data of four pixels are not of the first line of the corresponding block (step S106), control circuit 108 controls memory 104 and decompression circuit 106 such that compressed data stored in the memory region allotted to the corresponding block are read and decompressed by decompression circuit 106 (step SilO).

Thereafter, compression circuit 102 compresses the decompressed data together with the newly input data of four pixels (step S112).

Thereafter, compression circuit 102 stores the data resulting from compression in the corresponding memory region of memory 104, under the control of control circuit 106 (step S114).

Thereafter, the process again returns to step S102, and successively input image data are compressed.

By such method of image data compression as described above, it becomes possible to perform fixed length code compression of image data without raster•block transformation, and therefore the method of image compression is simplified and the cost necessary for image data compression can be reduced.

In the above described fixed length code image compression, compression and decompression are performed on small areas including four pixels (1 line of the block), 8 pixels (2 lines of the block), 12 pixels (3 lines of the block) and 16 pixels (1 block), resulting in image data compression of a block including 4×4 pixels with the compression ratio of 8/3.

Let us represent a mean value of pixel values (for example, luminance and intensity value of color signals) in the small areas including 4, 8, 12 and 16 pixels respectively by LA, index of tone width by LD, maximum value of the pixel values by Lmax, minimum value of the pixel values by Lmin, pixel value of each pixel by xij (i, j=1 to 4), quantization value of the pixel value of each pixel by $\phi_{ij}$ (i, j=1 to 4) and decoding value of the pixel value of each pixel by yij (i, j=1 to 4).

Figure 12:
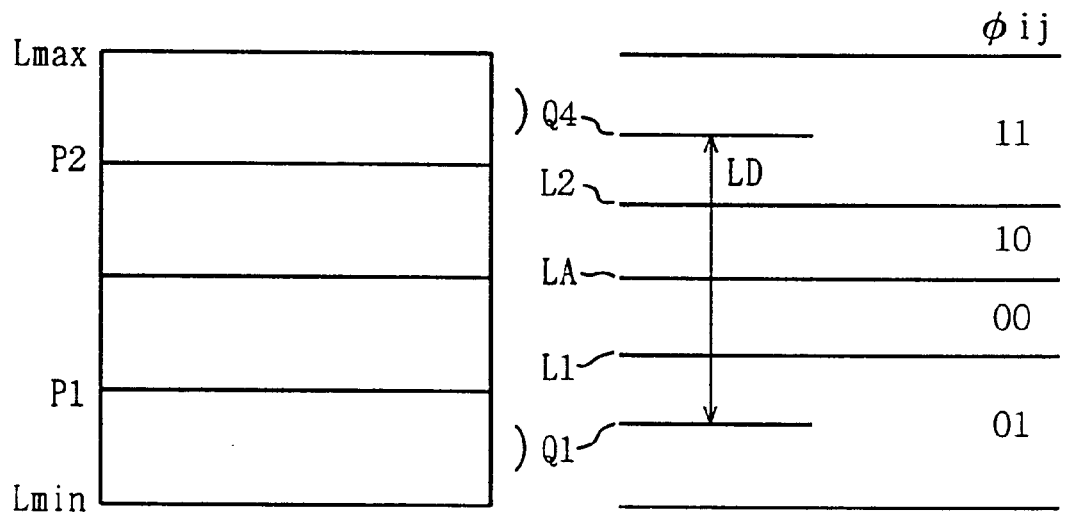
FIG. 12 is an illustration showing principle of FBTC compression.

FIG. 12 shows the concept of the principle when image compression is performed with the compression ratio of 8/3.

First, the pixel values of respective pixels included in the small area from the maximum value Lmax and the minimum value Lmin is equally divided into four.

The boundary between the areas divided into four will be referred to as P1, LA and P2. Here, LA is the mean value of the pixel values in the small area. Boundary value P1 is on the side nearer to the minimum value Lmin. The boundary value P2 is on the side nearer to the maximum value Lmax.

A mean value in the area between the boundary value P1 and the minimum value Lmin will be represented by Q1, and a mean value in the region between the boundary value P2 and the maximum value Lmax is represented by Q4. The tone width index Ld represents result of subtraction of mean value Q1 from mean value Q4 (Q4−Q1).

Thereafter, as a boundary value of the level for coding, level boundary values L1 and L2 are calculated. Here, the level boundary value L1 is calculated by L1=LA−LD/4, while boundary value L2 is calculated by L2=LA+LD/4.

With the level values for coding determined in the above described manner, coding is performed on each pixel in the following manner.

First, when the value of the pixel value of each pixel exists between the level boundary value L2 and the maximum value Lmax, the quantization value $\phi_{ij}$ is set to $\phi_{ij}$=11.

When the pixel value exists between the level boundary value L2 and the mean value LA, the quantization value $\phi_{ij}$ is set to $\phi_{ij}$=10.

Similarly, when the pixel value of each pixel exists between the mean value LA and the level boundary value L1, $\phi_{ij}$ is set to $\phi_{ij}$=00, and when it exists between the level boundary value L1 and minimum value Lmin, the quantization value for that pixel will be $\phi_{ij}$=01.

As a result of coding in this manner, code data is constituted by mean value LA, tone width index LD and quantization value $\phi_{ij}$.

Here, the mean value LA is represented by 8 bits, and the tone width index LD is also a numerical value of 8 bits. As for the quantization value $\phi_{ij}$, 2 bits of data correspond to each pixel, and therefore the data amount is 2 bits×number of pixels.

In decompression, each decoding value yij is set such that when $\phi_{ij}$ is 01, yij is set to yij=D−LD/2 based on the code data, when the quantization value $\phi_{ij}$ is 00, yij=LA−LD/6, when the quantization value $\phi_{ij}$ is 10, yij is yij=LA+LD/6, and when the quantization value $\phi_{ij}$ is 00, yij is set to yij=LA+LD/2.

Figure 13:
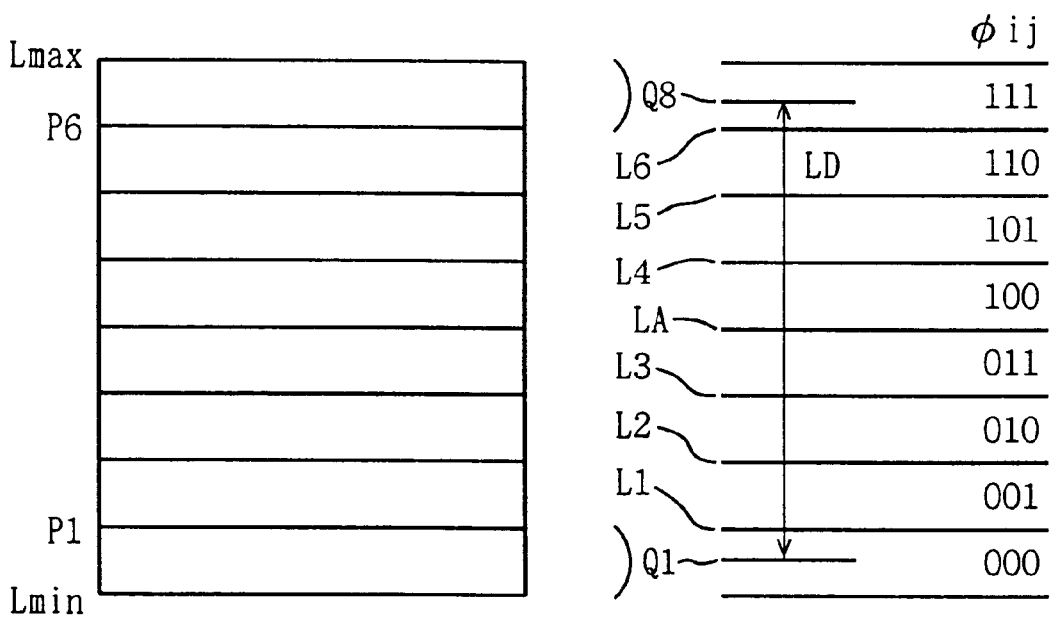
FIG. 13 is an illustration showing the principle of FBTC processing (compression ratio 2).

FIG. 13 is an illustration showing the principle of FBTC compression with the compression ratio of 2.

When fixed length code image data compression is to be performed with the compression ratio of 2, first, the pixel values of respective pixels included in each small area between the maximum value Lmax and the minimum value Lmin are divided equally into 8.

Of the boundaries of the region divided into 8, the value of the one nearest to Lmin is represented by P1, and the value of that one which is nearest to Lmax is represented by P6. Further, the mean value of all the pixels will be represented by LA.

The mean value in the area between boundary value P1 and minimum value Lmin is represented by Q1, and a mean value in the area between boundary value P6 and maximum value Lmax is represented by Q4.

The tone width index LD is calculated by LD=Q4−Q1.

Thereafter, as the boundary value of the level for quantization, level boundary values L1 to L6 are calculated in the following manner.

Level boundary value L1 is calculated by L1=LA−3×LD/8. Level boundary value L2 is calculated by L2=LA−2×LD/8. Level boundary value L3 is calculated by L3=LA−LD/8. Level boundary value L4 is calculated by L4=LA+LD/8. Level boundary value L5 is calculated by L5=LA+2×LD/8. Level boundary value L6 is calculated by L6=LA+3×LD/8.

Based on the level boundary values calculated in the above described manner, the pixel value of each pixel is coded in the following manner.

When the pixel value of each pixel exists between level boundary value L6 and the maximum value Lmax, quantization value $\phi$ij is set to 111. When it exists between level boundary values L5 and L6, 110 is allotted to the quantization value. When it exists between level boundary values L4 and L5, quantization value of 101 is allotted. When it exists between the mean value LA and level boundary value L4, the quantization value of 100 is allotted. When it exists between the level boundary value L3 and mean value LA, quantization value 011 is allotted. When it exists between level boundary values L2 and L3, quantization value of 010 is allotted. When it exists between level boundary values L1 and L2, quantization value of 001 is allotted. When it exists between the minimum value Lmin and level boundary value L1, quantization value 000 is allotted.

As a result of such coding, the code data is constituted by mean value LA, tone width index LD and quantization value $\phi$ij. Here, the mean value LA is a numerical value of 8 bits, and the tone width index LD is also a numerical value of 8 bits. As for the quantization value $\phi$ij, since 3 bits of data correspond to each pixel, the data amount is 3 bits×number of pixels.

For decompression, the decoding value yij for each pixel is determined in the following manner.

More specifically, when quantization value $\phi$ij is 000, yij is calculated by yij=LA−LD/2. When quantization value $\phi$ij is 001, yij is calculated by yij=LA−5×LD/14, when $\phi$ij is 010, then yij=LA−3×LD/14, when quantization value $\phi$ij is 011, then yij=LA−LD/14, when quantization value $\phi$ij is 100, then yij=LA+LD/14, when quantization value $\phi$ij is 101, then yij=LA+3×LD/14, when quantization value $\phi$ij is 110, then yij=LA+5×LD/14, and when quantization value $\phi$ij is 111, then yij=LA+LD/2, respectively.

Figure 14:
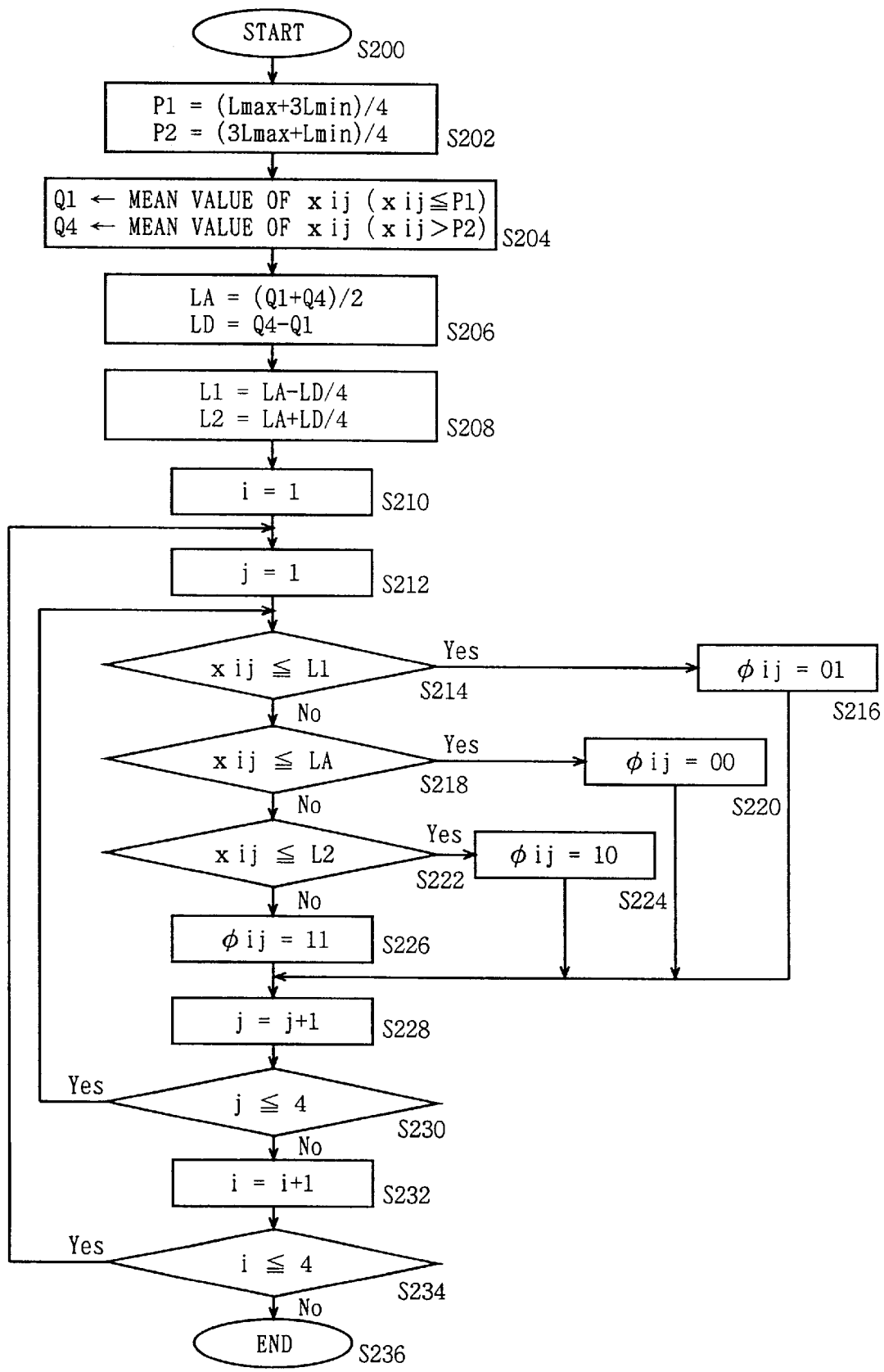
FIG. 14 is a flow chart showing the flow of image data compression in accordance with the FBTC method.

FIG. 14 is a flow chart showing the flow of image data compression with the compression ratio of 8/3 shown in FIG. 12.

More specifically, compression circuit 102 shown in FIG. 1 compresses image data in accordance with the flow chart.

However, FIG. 14 shows a flow when image data of 16 pixels, that is, 4 columns×4 rows are compressed. The flow of such a process may be modified to be applicable to 4 columns×1 row, 4 columns×2 rows or 4 columns×3 rows, for example, in the following manner.

When the process starts (step S200), compression circuit 102 calculates boundary values P1 and P2 in accordance with the following equations (step S202).

P1=(Lmax+3Lmin)/4 (1)

P2=(3Lmax+Lmin)/4 (2)

Compression circuit 102 calculates Q1 which is the mean value when the pixel value xij of each pixel is lower than the boundary value P1 in accordance with the equation (1), and Q4 which is the mean value when the pixel value xij of each pixel is larger than the boundary value P2 calculated in accordance with the equation (2) (step S204).

Thereafter, compression circuit 102 calculates the mean value LA and the tone width index LD of the pixel values in the small area in accordance with the following equations (step S206).

LA=(Q1+Q4)/2 (3)

LD=Q4−Q1 (4)

Thereafter, compression circuit 102 calculates level boundary values L1 and L2 in accordance with the following equations (step S208).

L1=LA−LD/4 (5)

L2=LA+LD/4 (6)

Thereafter, the value of variable i is initialized to 1 (step S210), and the value of variable j is initialized to 1 (step S212).

Here, variable i represents the row of the pixel to be quantized while the variable j represents the column of the pixel.

Thereafter, pixel value xij is compared with the level boundary value L1 (step S214). When it is determined that pixel value xij is smaller than the level boundary value L1 (step S214), 01 is allotted to quantization value $\phi$ij (step S216), and the value of variable j is incremented by 1 (step S228).

The value of the variable j is compared with the maximum value of the column, for example, the numerical value 4 (step S230), and when the value of the variable j is not larger than 4, the process returns to step S214.

When the value of the variable j exceeds the maximum value of the column, that is, 4 (step S230), then the value of variable i is incremented by 1 (step S232).

Whether the value of variable i is not larger than the maximum value of the row, for example, the numerical value 4, is determined (step S234) and when the variable i is not larger than 4, the process returns to step S212.

Meanwhile, when the value of the variable i is larger than the numeral value 4, which is the maximum value of the row (step S234), image processing for the block is completed (step S236). Meanwhile, when it is determined in step S214 that the pixel value xij is not smaller than the level boundary value L1, then the pixel value xij is compared with the mean value LA. When the pixel value xij is not higher than the mean value LA, 00 is allotted as quantization value $\phi$ij (step S220) and the process proceeds to step S228.

Meanwhile, when it is determined that pixel value xij is larger than the mean value LA (step S218), then pixel value xij is compared with level boundary value L2 (step S222).

When the pixel value xij is not higher than the level boundary value L2, then 10 is allotted to quantization value $\phi$ij (step S224) and the process proceeds to step S228.

When it is determined that the pixel value xij is higher than the level boundary value L2 (step S222), 11 is allotted to quantization value $\phi$ij (step S226) and the process proceeds to step S228.

After the process proceeds to step S228, comparison of each pixel of the block is successively performed in the similar manner as described above, and image compression is performed.

In the foregoing, fixed length code data compression of pixels in 1 block, that is, a pixel block of 4 columns×4 rows has been described.

When data compression is to be performed on pixels in 4 columns×1 row, for example, in the process from step S202 to step S208, mean value LA, tone width index LD and level boundary values L1 and L2 should be calculated for the pixels in 4 columns×1 row, and in step S234, variable i should be compared with numeral 1.

When the number of rows is 2 or 3, mean value LA, tone width index LD and level boundary values L1 and L2 may be calculated correspondingly, and the value to be compared with the variable i may be changed in step S234.

Further, as described with reference to FIG. 13, when fixed length code data compression is to be performed with the compression ratio of 2, simply the process of calculating the level boundary values and the like and the process for allotting quantization value $\phi ij$ based on the comparison with the level boundary value and pixel value xij are modified, and essential process flow is similar.

Figure 15:
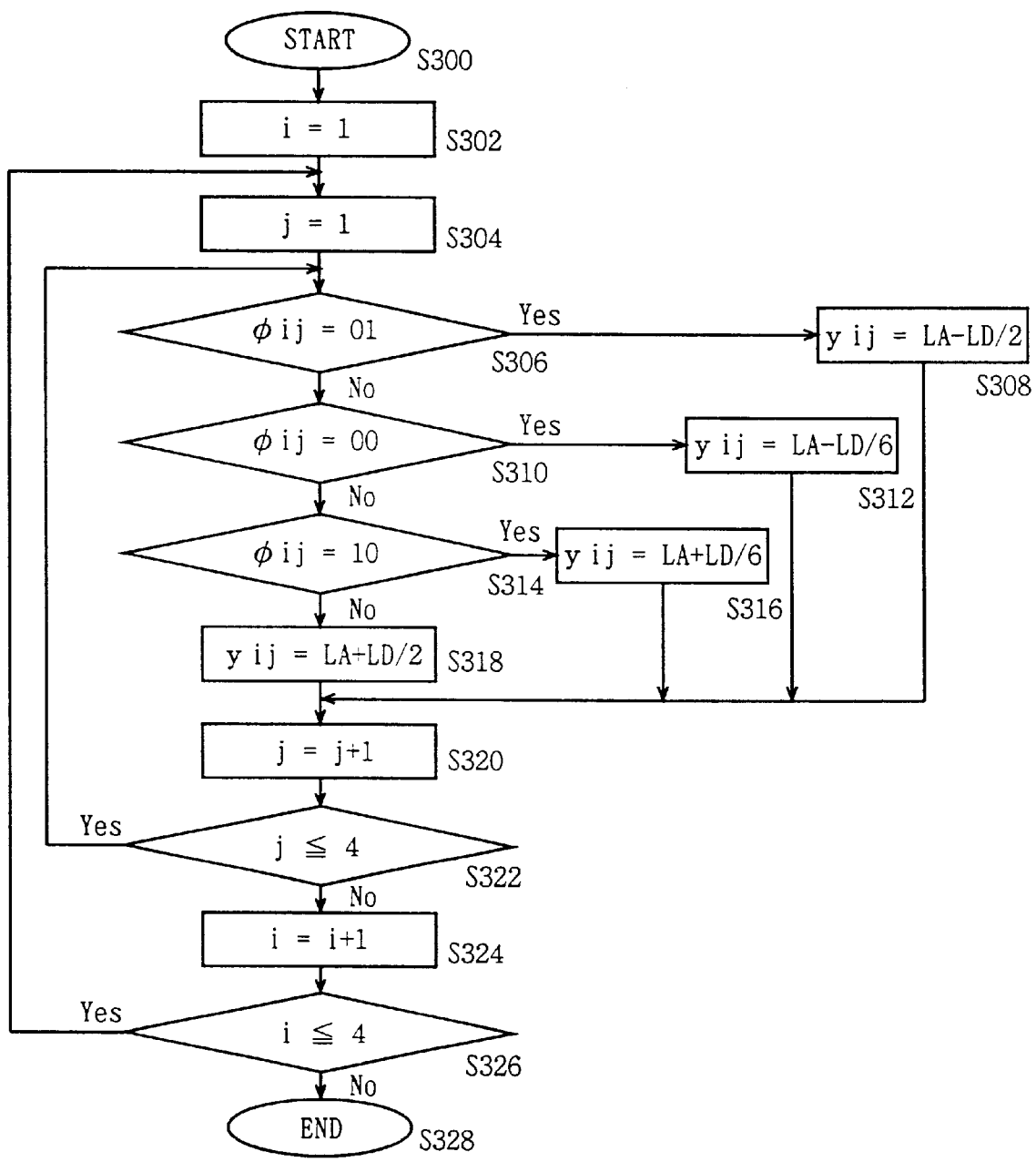
FIG. 15 is a flow chart showing the flow of image data decompression in accordance with the FBTC method.

FIG. 15 is a flow chart showing the operation of decompression circuit 106 of FIG. 1.

When the process starts (step S300), decompression circuit 106 initializes the value of variable i to 1 (step S302) and initializes the value of variable j to 1 (step S304).

Thereafter, decompression circuit 106 determines whether the quantization value $\phi ij$ which is the compressed data corresponds to numeral 01 or not (step S306). When it is determined that the quantization value $\phi ij$ is equal to 01 (step S306), then decoding value yij is set to yij=LA−LD/2 (step S308).

Thereafter, the value of variable j is incremented by 1 (step S320), and when the value of the variable j is determined to be not higher than the maximum value of the column, for example, 4 (step S322), the process returns to step S306.

Meanwhile, when it is determined that the value of the variable j is higher than the maximum value of the column, that is, 4 (step S322), the value of variable i is incremented by 1 (step S324).

Thereafter, the value of variable i is compared with the maximum value of the row, that is, numerical value 4 (step S326), and when the value of variable i is not higher than 4, the process returns to step S304. Meanwhile, when the value of variable i is determined to be higher than 4, decompression is completed (step S328).

Meanwhile, when it is determined in step S306 that the quantization value $\phi ij$ is not 01, then quantization value $\phi ij$ is compared with the numerical value 00 (step S310). When the quantization value $\phi ij$ is 00, yij=LA−LD/6 is allotted to decoding value yij (step S312) and the process proceeds to step S320.

When quantization value $\phi ij$ is not 00 (step S310), then quantization value $\phi ij$ is compared with numerical value 10 (step S314).

When the quantization value $\phi ij$ is 10, then yij=LA+LD/6 is allotted to decoding value yij (step S316), and the process proceeds to step S320.

When it is determined that quantization value $\phi ij$ is not 10, then yij=LA+LD/2 is allotted to decoding value yij (step S318), and the process proceeds to step S320.

The process after the value of variable j is incremented by 1 in step S320 is completely the same as the process after the value of variable j is incremented by 1 in step S308. Therefore, data decompression is performed on each pixel in the block.

In the foregoing, decompression of 4 columns×4 rows of pixel data in 1 block has been described. When decompression of pixel data of 4 columns×1 row is to be performed, in step S326, the variable i should be compared with numerical value 1.

When pixel data of 4 columns×2 rows or 4 columns×3 rows is to be performed, the content of step S326 may be modified accordingly.

In the example shown in FIG. 15, the data which has been subjected to fixed length code data compression with the compression ratio of 8/3 is decompressed. The process flow is basically the same for the compressed data which has been subjected to fixed length code data compression with the compression ratio of 2, except that the process for allotting the quantization value and corresponding decoding value is different.

As described with reference to FIGS. 14 and 15, in the FBTC method, fixed length code data compression or data decompression is performed. Therefore, high definition images are less susceptible to quality degradation, and images can be readily edited in the compressed state. Further, since the process algorithm is simple, it can be implemented in a small scale hardware, and high speed processing is also possible.

Second Embodiment

Figure 16:
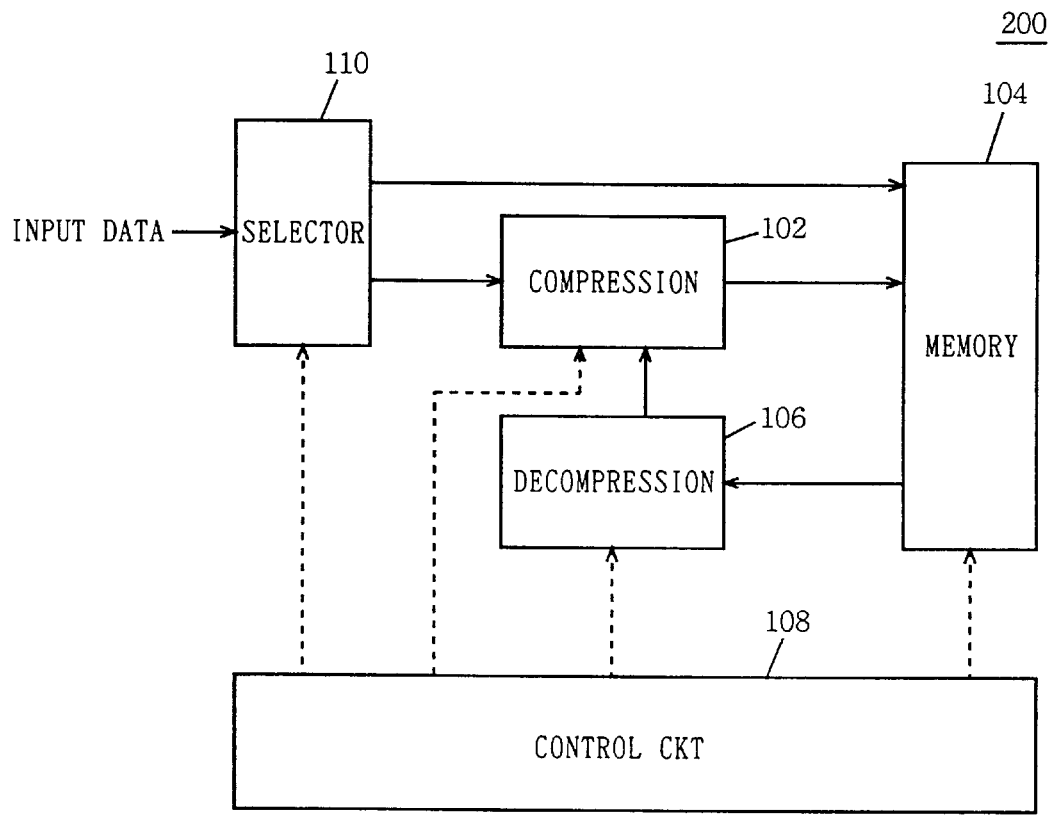
FIG. 16 is a schematic block diagram showing a structure of image compression apparatus 200 in accordance with a second embodiment of the present invention.

FIG. 16 is a schematic block diagram showing a structure of image compression apparatus 200 in accordance with a second embodiment of the present invention.

Image compression apparatus 200 includes: control circuit 108 controlling image compression operation; a selector 110 receiving image data externally input successively and serially line by line, for switching destination of output thereof, in accordance with which row of the block to be compressed the input image data corresponds to, under the control of control circuit 108; compression circuit 102 receiving, when the input image processing data corresponds to a row exceeding a prescribed number of rows of the corresponding block, the output from selector 110 and image data applied from decompression circuit 106 which will be described later, for integrating these, performing fixed length code data compression and outputting the result, under the control of control circuit 108; memory 104 for directly receiving, when the image data input to selector 110 is of the row not exceeding the prescribed number of rows of the corresponding block, the output from selector 110 and stores the output in the memory region allotted for the corresponding block of the image data, and when the image data input to selector 110 is of the row exceeding the prescribed number of rows of the corresponding block, the compressed data output from compression circuit 102, and stores the compressed data in the corresponding memory region; and decompression circuit 106 for reading data stored in the memory region allotted to that block which is to be compressed by compression circuit 102, decompresses and applies the result to compression circuit 102 under the control of control circuit 108.

The operation of image compression apparatus 200 will be described.

FIGS. 17 to 24 are illustrations showing the operation of image compression apparatus 200 of FIG. 16.

In the following, it is assumed that finally, the original data is divided into small areas (blocks) of 4×4 pixels and compression is performed in accordance with the FBTC method with the compression ratio of 2.

Figure 17:
FIGS. 17 to 24 are first to eighth illustrations showing the concept of operation of image compression apparatus 200.

First, referring to FIG. 17, when the first line of the original image data is input, selector 110 outputs data of the first block (pixel data 1 to 4) to memory 104 under the control of control circuit 108, and memory 104 stores the data in that memory region which is expected to store the compressed data of the first block.

Figure 18:

Referring to FIG. 18, when the second block of the first line (pixel data 5 to 8) is input, similarly, selector circuit 110 outputs the input data to memory 104, and memory 104 stores the data in that memory region which is expected to store the compressed data of the second block.

Thereafter, similar process is performed on all the remaining data (pixel data 9 to N) of the first line of the input data.

Figure 19:

Referring to FIG. 19, when the data of the second line is input successively, selector 110 stores the data of the first block (pixel data N+1 to N+4) to the empty region of the memory region which is expected to store the compressed data of the first block in memory 104 under the control of control circuit 108.

Figure 20:

Thereafter, referring to FIG. 20, when the second block of the second line (pixel data N+5 to N+8) is input, selector 110 stores the input data in the empty region of the memory region in memory 104 which is expected to store the compressed data of the second block in the similar manner.

Thereafter, similar process is performed on all the remaining data (pixel data N+9 to 2N) of the second line of the input data.

Figure 21:
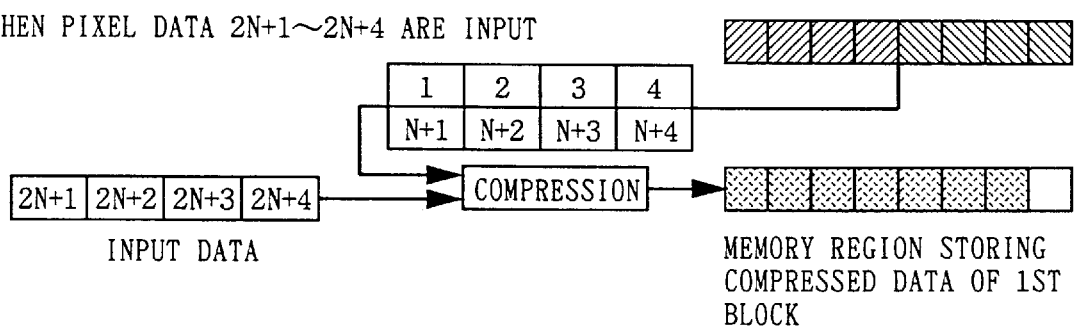

Thereafter, referring to FIG. 21, when the data of the third line are input, selector 110 outputs externally input image data to compression circuit 102 under the control of control circuit 108. Meanwhile, decompression circuit 106 reads stored data from that region of memory 104 which stores the data of the first block and outputs the read data directly (without decompression) to compression circuit 102. Compression circuit 102 compresses a total of three lines of data including the data which has been stored in the memory and the third line of data (pixel data 2N+1 to 2N+4), and stores the compressed data of the first block to the memory region which is expected to store that data.

Figure 22:
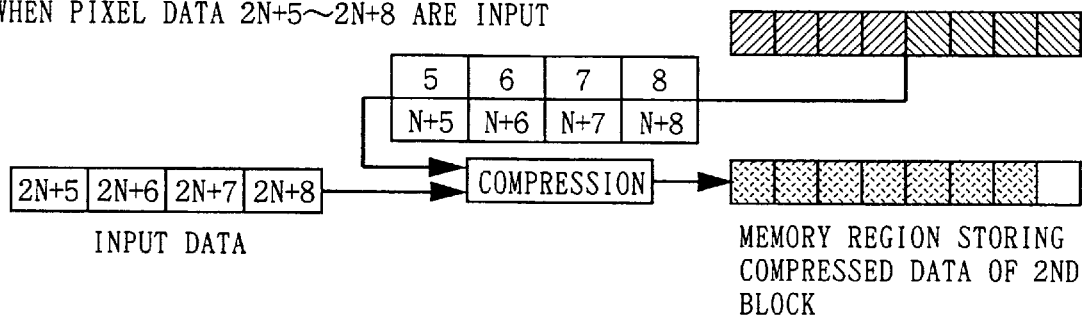

Referring to FIG. 22, when image data of the second block of the third line are input, decompression circuit 106 reads compressed data from that memory region which stores the second block of data in memory 104 and outputs the data directly to compression circuit 102, under the control of control circuit 108. Compression circuit 102 compresses data of a total of three lines including the data which has been stored in the memory and the third line of data (pixel data 2N+5 to 2N+8) under the control of control circuit 108, and stores the compressed data of the second block in the expected memory region.

Thereafter, similar process is performed on all the remaining data (pixel data 2N+9 to 3N) of the third line of the input data.

Figure 23:
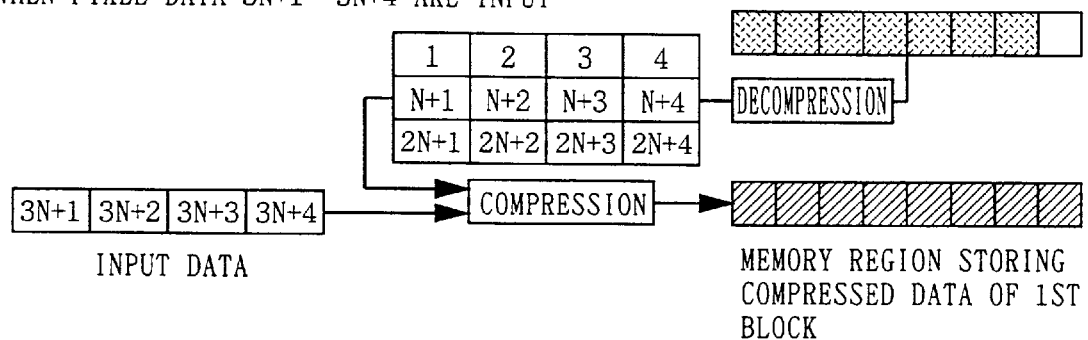

Thereafter, referring to FIG. 23, when the data of the fourth line are input, selector 110 outputs the input data directly to compression circuit 102. Meanwhile, decompression circuit 106 reads and decompresses the stored compressed data from the memory region allotted to the data of the first block in memory 104, and outputs the results to compression circuit 102. Compression circuit 102 compresses data of a total of four lines including the result of decompression of the data which has been stored in the memory and the data of the fourth line (pixel data 3N+1 to 3N+4), and stores the compressed data of the first block to the expected memory region.

Figure 24:
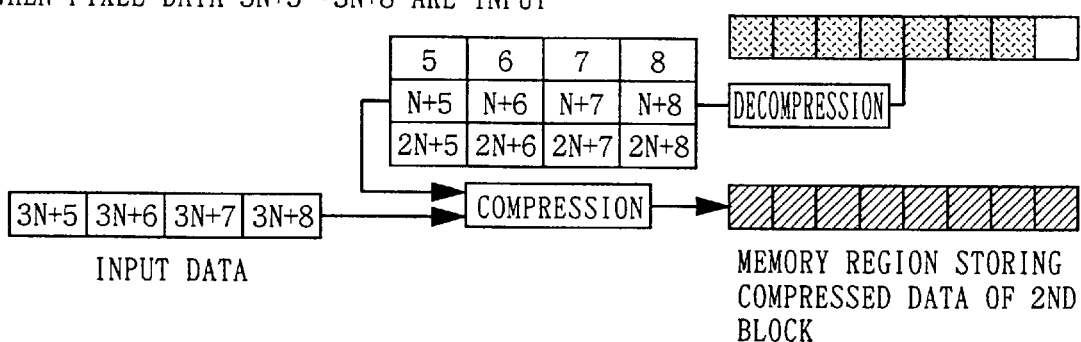

Then, referring to FIG. 24, when the data of the second block of the fourth line are input, selector 110 outputs the input data to compression circuit 102 in the similar manner.

Decompression circuit 106 reads the stored data from the memory region storing the second block of data in memory 104, decompresses the read data and outputs the result to compression circuit 102. Compression circuit 102 compresses data of a total of four lines including the result of decompression and the data of the fourth line (pixel data 3N+5 to 3N+8), and stores the compressed data of the second block in the expected memory region.

Thereafter, similar process is performed on all the remaining data (pixel data 3N+9 to 4N) of the fourth line of the input data.

The above described process is repeated for every four rows of image data, and image data of one image plane are compressed.

By such processing, it becomes possible to implement an image processing apparatus for performing fixed length code data compression of image data without raster•block transformer, and manufacturing cost can be reduced.

Figure 25:
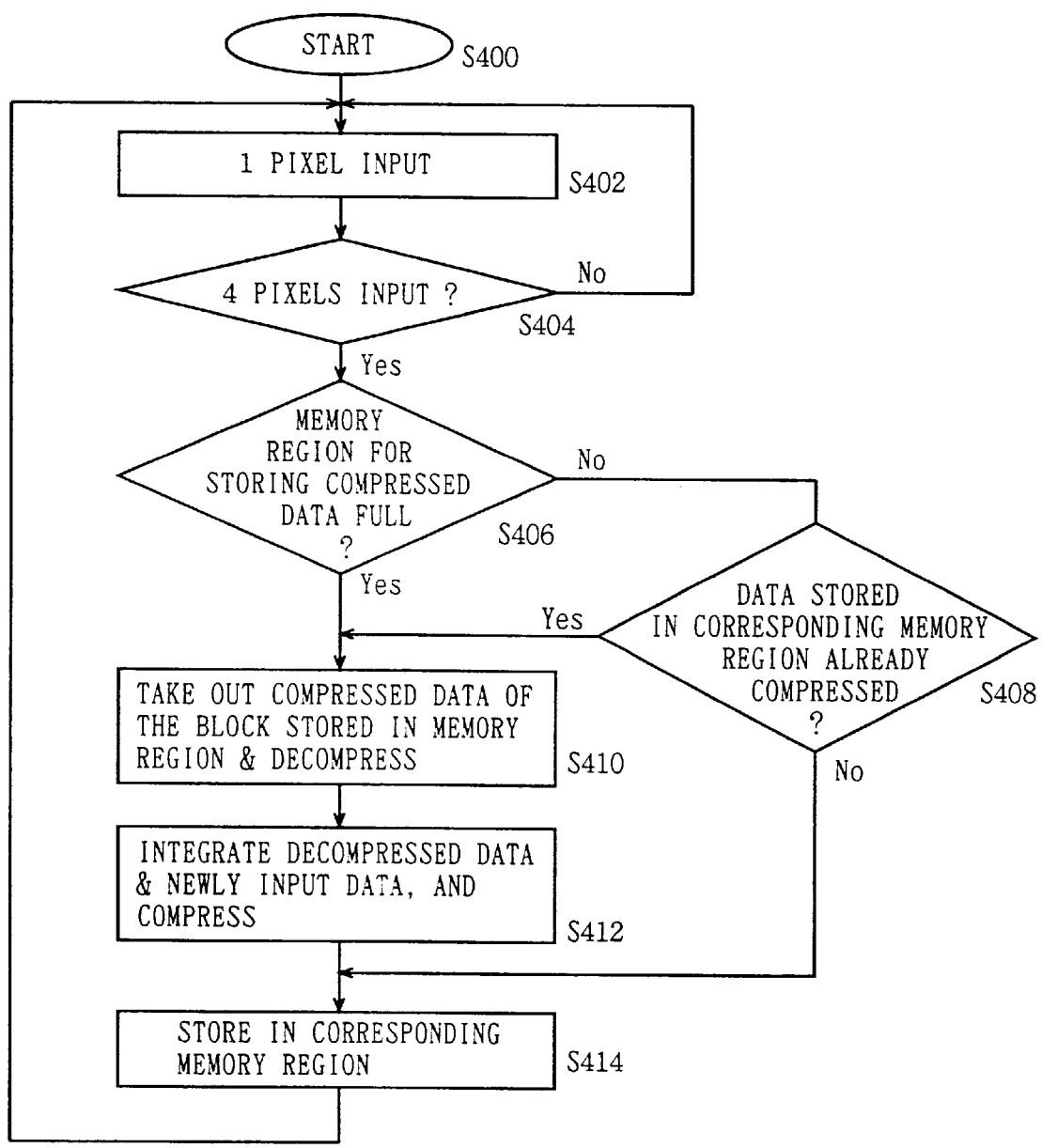
FIG. 25 is a flow chart showing image compression in accordance with the first embodiment of the present invention.

FIG. 25 is a flow chart showing the operation of image compression apparatus 200 shown in FIGS. 17 to 24.

When the process starts (step S400), image compression apparatus 200 controls selector 110 such that image data of one pixel is input to the corresponding destination of output (step S402).

Thereafter, control circuit 108 determines whether or not the input number of pixels corresponds to four pixels (step S404).

When input of four pixels has not yet been completed, the process returns to step S402. When input of pixel data of four pixels has been completed (step S404), whether the corresponding memory region for storing the data is full or not is determined (step S406).

When it is determined that the memory region allotted to the corresponding block of image data which is currently input is not full, then whether or not the data stored in the corresponding memory region has been already compressed or not is determined (step S408).

When it is determined that the data stored in the corresponding memory region has not yet been compressed (step S408), the input data is stored in the corresponding memory region of memory 104 (step S414), and the process returns to step S402.

When it is determined that the data stored in the corresponding memory region has been already compressed (step S408), decompression circuit 106 takes out and decompresses the compressed data of the corresponding block stored in the memory region (step S410).

Thereafter, compression circuit 102 compresses both the decompressed data and newly input data, and outputs the result (step S412).

The compressed data is stored in the corresponding memory region of memory 104 (step S414) and the process returns to step S402.

Meanwhile, in step S406, when it is determined that the corresponding memory region for storing the compressed data is full, decompression circuit 106 takes out and decompresses the compressed data of the corresponding block stored in the memory region (step S410).

However, when the data stored in memory 104 has not yet been compressed (corresponding to the cases of FIGS. 21 and 22), decompression circuit 106 outputs the data read from the corresponding memory region of memory 104 directly to compression circuit 102 without decompression.

Compression circuit 102 compresses both the data output from decompression circuit 102 and the newly input data (step S412).

Thereafter, the compressed data is stored in the corresponding memory region in memory 104 (step S414), and the process returns to step S402.

By such processing, the data corresponding to the prescribed number of rows in the block, two rows in the above example, are directly stored in the memory region allotted to the corresponding block of memory 104, and after image data of the row exceeding the prescribed number of rows of the block is input, the data which has been stored in the corresponding memory region of memory 104 and the data corresponding to the newly input row of the block are compressed together and stored in the corresponding memory region.

In the foregoing, the prescribed number of rows is 2. However, the number of rows may be appropriately changed in accordance with the compression ratio for compression or the size of the memory region allotted to each block.

By the above described process, it becomes unnecessary to repeatedly compress and decompress the data in each block to be compressed of image data and to store the data in memory 104 as in the first embodiment. In other words, image data up to the prescribed number of rows in the block are stored in the memory 104 as they are, and therefore it is not necessary to repeat compression and decompression.

This also means that the degradation of image quality inherent to the repetition of compression and decompression can be minimized.

Third Embodiment

Figure 26:
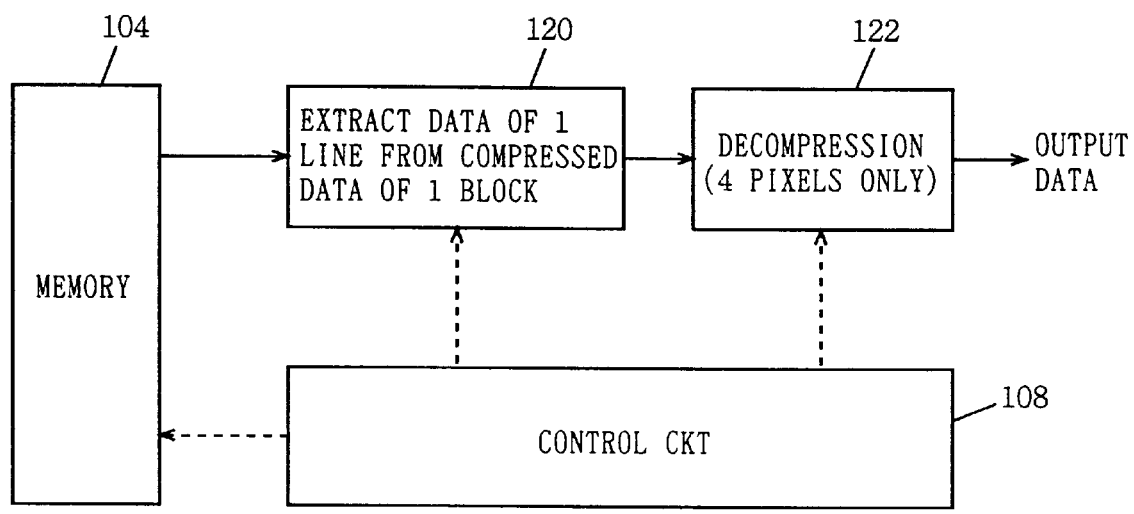
FIG. 26 is a schematic block diagram showing a structure of an image decompression apparatus 300 in accordance with a third embodiment of the present invention.

FIG. 26 is a schematic block diagram showing a structure of image decompression apparatus 300 in accordance with the third embodiment of the present invention.

Image decompression apparatus 300 includes: memory 104 storing compressed image data; a data extraction circuit 120 for extracting data of one line out of the compressed data of 1 block from the memory region having the compressed data corresponding to the line of image data to be output (dependent on the block size: for example, 4 pixels); control circuit 108 for controlling fixed length code data decompression; and decompression circuit 122 receiving data extracted by data extraction circuit 120 for performing fixed length code data decompression.

The operation of image decompression circuit 300 will be described.

FIGS. 27 to 34 are illustrations showing the concept of operation of image decompression apparatus 300.

The image decompression described in the following is of the type in which data which has been compressed block by block and stored in the memory is subjected to repeated data decompression without using block•raster transformer and decompression of block unit is finally completed. The compressed data is input to the decompressor directly, subjected to fixed length code data decompression, and output as original image data line by line.

In the following, description will be given on an example in which the original image data is divided into small areas (blocks) each having 4×4 pixels, and data compressed by FBTC method with the compression ratio of 8/3 are decompressed to the original image data.

Figure 27:
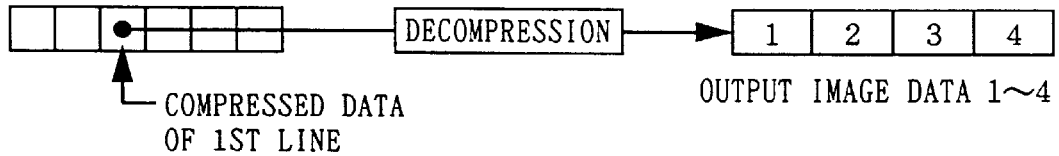
FIGS. 27 to 34 are first to eighth illustrations showing the concept of operation of the image decompression apparatus 300.

First, referring to FIG. 27, when the first line of image data to be output (image data 1 to N) is to be output, data extraction circuit 120 extracts only the compressed data of the first line out of the compressed data of the first block stored in the memory, performs fixed length code data decompression and outputs pixel data 1 to 4.

Figure 28:
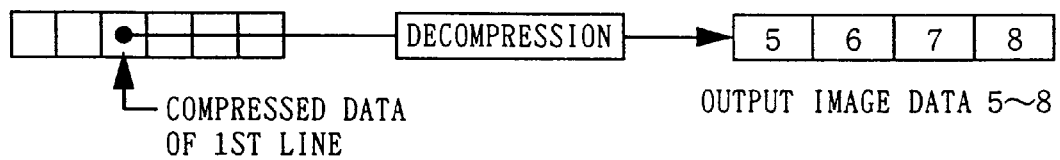

Thereafter, referring to FIG. 28, data extraction circuit 120 extracts only the compressed data of the first line out of the compressed data of the second block of the first line, and decompression circuit 122 performs fixed length code data decompression on the extracted compressed data, and outputs pixel data 5 to 8.

Thereafter, by repeating similar process on all the remaining data (pixel data 9 to N) of the first line of image data, the data of the first line are successively output.

Figure 29:
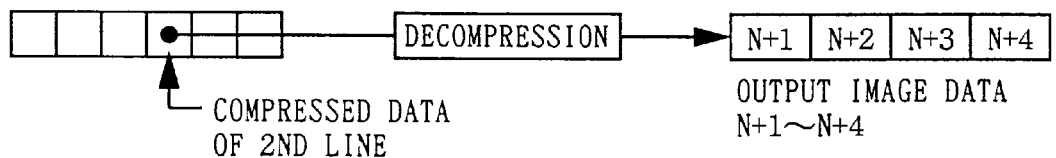

Referring to FIG. 29, when the data of the second line are to be output, data extraction circuit 120 extracts only the compressed data of the first line out of the compressed data of the first block. Receiving the extracted data, the decompression circuit 122 decompresses and outputs pixel data N+1 to N+4.

Figure 30:
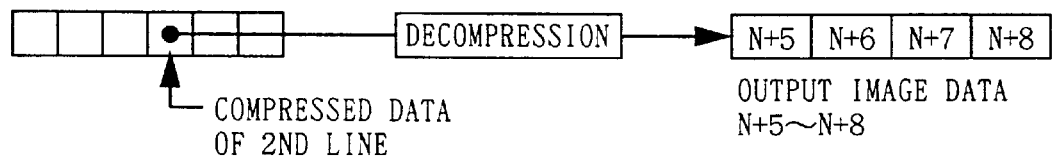

Thereafter, referring to FIG. 30, of the compressed data of the second block of the second line, data extraction circuit 120 outputs only the compressed data of the second line, and decompression circuit 122 decompresses the data and outputs pixel data N+5 to N+8. Thereafter, similar process is repeated on all the remaining data (pixel data N9 to 2N) of the second line of the image data, and image data of the second line are output.

Figure 31:
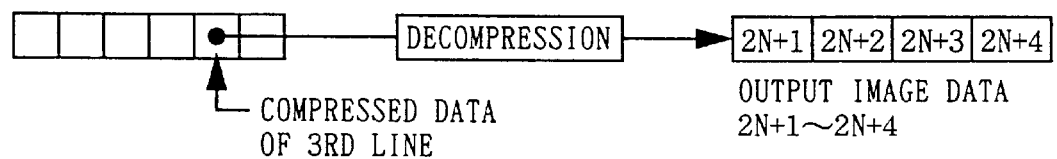

Thereafter, referring to FIG. 31, when the data of the third line (2N+1 to 3N) are to be output, data extraction circuit 120 extracts only the compressed data of the third line out of the compressed data of the first block stored in the memory. Receiving the extracted data, decompression circuit 122 decompresses and outputs pixel data 2N+1 to 2N+4.

Figure 32:
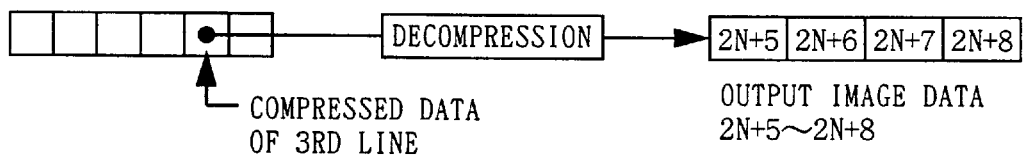

Referring to FIG. 32, data extraction circuit 120 extracts and outputs only the pixel data 2N+5 to 2N+8 of the second block of the compressed data of the third line in memory 104. Decompression circuit receives and decompresses the data, and outputs image data 2N+5 to 2N+8.

Thereafter, similar data extraction and decompression are performed on all the remaining data (pixel data 2N+9 to 3N) of the third line.

Figure 33:
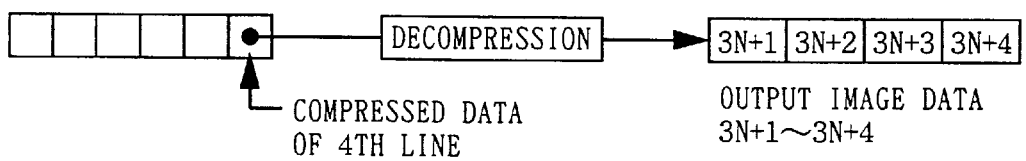
Figure 34:
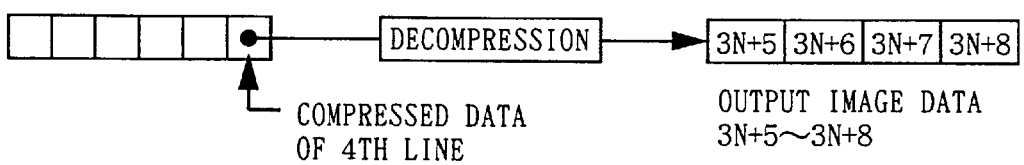

Referring to FIGS. 33 and 34, similar process is performed on the first and second blocks of the fourth line, and pixel data 3N+1 to 3N+4 are output as a result of decompression of the data of the first block, and pixel data 3N+5 to 3N+8 are output as the result of decompression of data of the second block.

By repeating such process for every four rows of image data, the original image is output line by line.

By this structure, it becomes possible to implement an image processing apparatus capable of fixed length code data decompression of image data without using a block-eraster transformer, and manufacturing cost thereof can be reduced.

Figure 35:
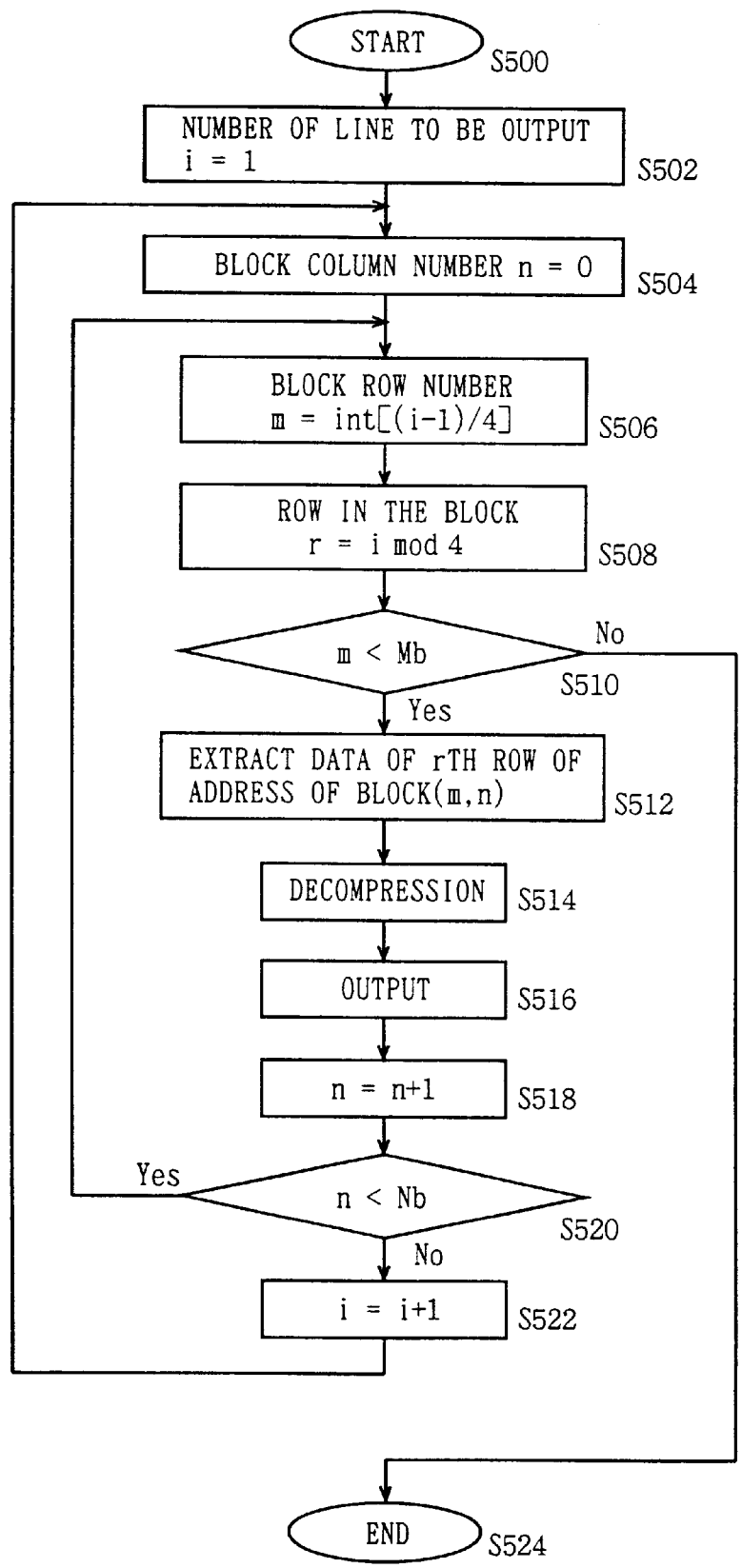
FIG. 35 is a flow chart showing the image decompression in accordance with the third embodiment of the present invention.

FIG. 35 is a flow chart showing the flow of image data decompression described with reference to FIGS. 27 to 34.

When the process starts (step S500), image decompression apparatus 300 initializes the value of variable i corresponding to the line number of image data to be output to 1 (step S502).

Thereafter, it initializes the value of variable n corresponding to the column number of the block to be read from memory 104 to 0 (step S504).

Thereafter, control circuit 108 calculates the row number m of the block to be read from memory 104 in accordance with the following equation.

$$m = \text{int}[(i-1)/4] \tag{7}$$

Since it is assumed that the pixel block has 4 columns×4 rows, the row number of the block is calculated by the equation (7) above. Here, the sign int [ ] represents that a maximum integer value not exceeding the numerical value in [ ] is given.

Thereafter, control circuit 108 calculates the value r of the row (line) of the block to be read in accordance with the following equation (step S508).

$$r = i \bmod 4 \qquad (8)$$

Here, the fact that the pixel block is divided at every four rows is utilized to find the row of the block.

Thereafter, control circuit 108 compares the value of variable m and the maximum number Mb of the block in the column direction (step S510), and when the variable m is not smaller than Mb, the process is completed (step S524).

Meanwhile, when the variable m is smaller than Mb, the process proceeds to the next step S512.

Thereafter, control circuit 108 controls data extraction circuit 120 such that only the data of the rth row are extracted from the address of the memory region corresponding to the block of m rows and n columns (hereinafter represented as block (m, n)) from memory 104 (step S512).

Thereafter, decompression circuit 122 decompresses four pixels of data extracted by data extraction circuit 120 (step S514) and externally outputs the result as image data (step S516).

Thereafter, the value of the variable n corresponding to the column number of the block is incremented by 1 (step S518).

Thereafter, the value of the variable n is compared with the number Nb of the columns in the block (step S520), and when the value of variable n is smaller than the number of columns Nb, the process returns to step S506.

Thereafter, the data corresponding to the rth row are read from the block corresponding to the next column number of the block, the read data are decompressed and data of four pixels are output, and these steps are repeated until output of image data of one line is completed.

Therefore, when output of image data of one line is completed and it is determined in step S520 that the value of variable n is higher than the number of columns Nb of the block, then the value of the variable i is incremented by 1 (step S522), the process returns to step S504, and the steps S504 to 522 are repeated for the rows of the next block, and corresponding line of image data is output.

By the above described image decompression, it becomes possible to perform fixed length code data decompression of image data without block•raster transformation by a simple structure, so that cost for image data decompression can be reduced.

Fourth Embodiment

Figure 36:
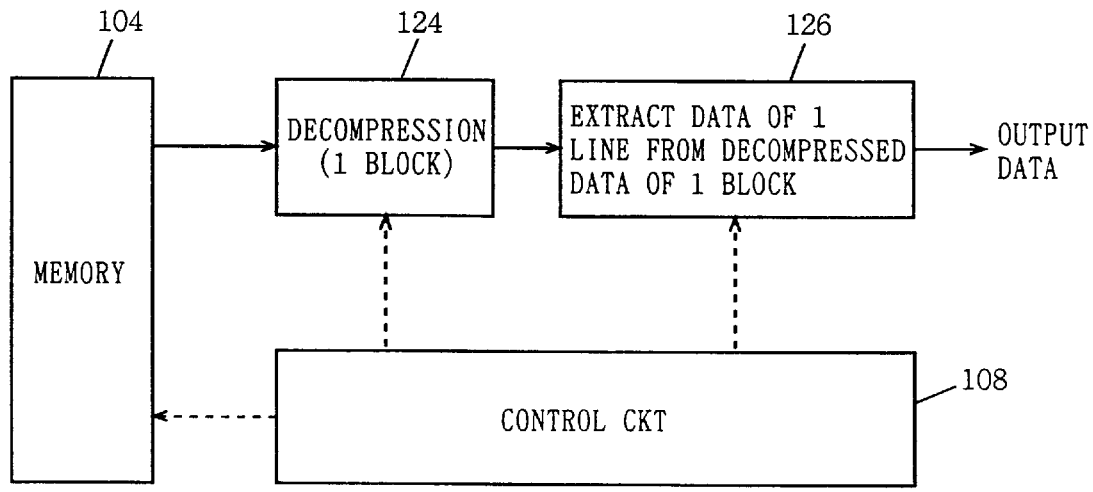
FIG. 36 is a schematic block diagram showing the structure of an image decompression apparatus 400 in accordance with the fourth embodiment of the present invention.

FIG. 36 is a schematic block diagram showing a structure of the image decompression apparatus 400 in accordance with the fourth embodiment of the present invention.

Image decompression apparatus 400 includes: control circuit 108 for controlling image decompression; memory 104 storing in memory regions corresponding to respective blocks when original image data are divided into blocks for image compression, the compressed image data respectively; a decompression circuit 124 for reading data from that memory region which corresponds to a designated block for performing fixed length code data decompression of one block under the control of control circuit 108; and data extraction circuit 126 receiving an output from decompression circuit 124 for extracting data of 1 line from the decompressed data of 1 block corresponding to the line of image data to be output.

The operation will be described briefly in the following.

FIGS. 37 to 44 are illustrations showing the concept of operation of image decompression apparatus 400.

Figure 37:
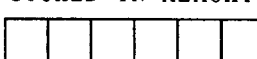

First, referring to FIG. 37, when the first line (pixel data 1 to N) of the image data are to be output, decompressor 120 decompresses compressed data of the first block stored in memory 104, and data extraction circuit 126 extracts and outputs pixel data 1 to 4 of the first line out of the decompressed data.

Figure 38:
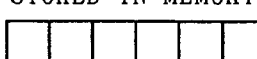

Thereafter, referring to FIG. 38, decompression circuit 124 decompresses and outputs compressed data of the second block under the control of control circuit 108. Data extraction circuit 126 extracts pixel data 5 to 8 of the first line out of the decompressed data, and outputs the data as the image data of the first line.

Thereafter, similar process is repeated on all the remaining data (pixel data 9 to N) of the first line of the pixel data, so that image data of the first line are output.

Thereafter, referring to FIG. 39, when image data of the second line (pixel data N+1 to 2N) are to be output, decompressor 124 decompresses compressed data of the first block stored in the memory, and data extraction circuit 126 extracts pixel data N+1 to N+4 of the second line out of the decompressed data, and outputs the pixel data as image data of the second line.

Thereafter, referring to FIG. 40, decompressor 124 decompresses compressed data of the second block, data extraction circuit 126 outputs pixel data N+5 to N+8 of the second line out of the decompressed data, and outputs as the image data of the second line.

Thereafter, by repeating similar process on all the remaining data (N+9 to 2N) of the second line of image data, the image data of the second line are decompressed and output.

Figure 42:
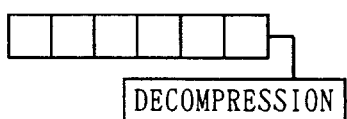

Thereafter, referring to FIGS. 41 and 42, decompression circuit 124 reads and decompresses compressed data of the first block for the image data of the third line, and of the resulting decompressed data, data extraction circuit 126 extracts the data of the third line. Therefore, image data 2N+1 to 2N+4 of the third line are output for the first block of data, and pixel data 2N+5 to 2N+8 are output in accordance with the result of decompression of the second block.

Thereafter, image data of the third line are output in the similar manner.

Figure 43:
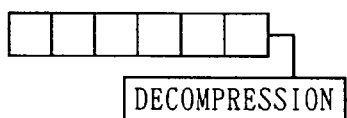
Figure 44:
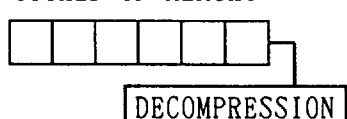

Further, for outputting the image data of the fourth line, referring to FIGS. 43 and 44, decompressor 124 reads and decompresses data of the first block, data extraction circuit 126 extracts the data of the fourth line and outputs pixel data 3N+1 to 3N+4 of the fourth line, and thereafter of the result of decompression by decompressor 124 of the data of the second block, data extraction circuit 126 extracts and outputs data 3N+5 to 3N+8 of the fourth line, so that image data of the fourth line are output.

Thereafter, similar process is repeated for the blocks of the next and following rows, and image data are externally output line by line for the entire original image.

By such a structure, it becomes possible to implement an image processing apparatus capable of fixed length code data decompression of image data without using a block•raster transformer, and manufacturing thereof can be reduced.

Figure 45:
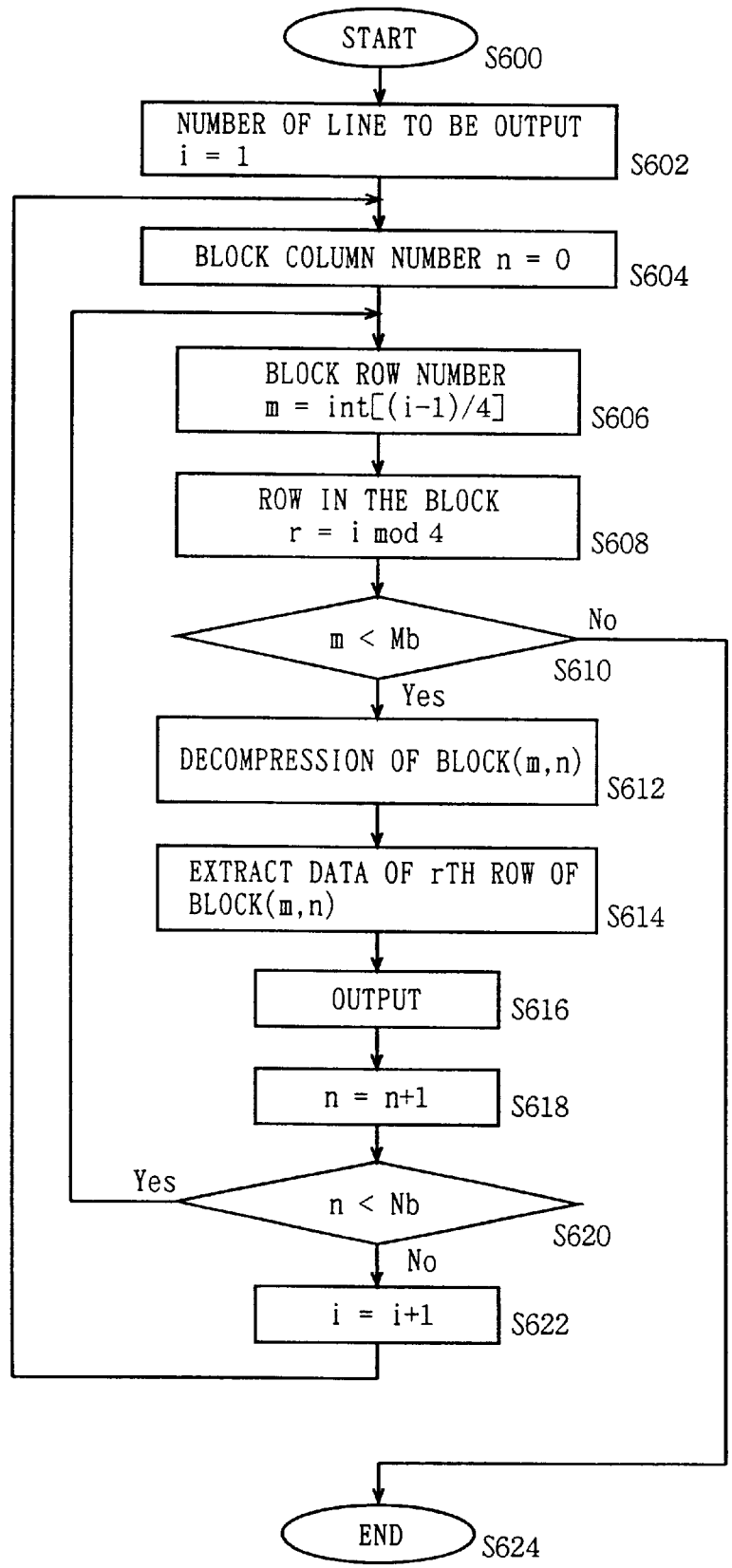
FIG. 45 is a flow chart showing image decompression in accordance with the fourth embodiment of the present invention.
Figure 46:
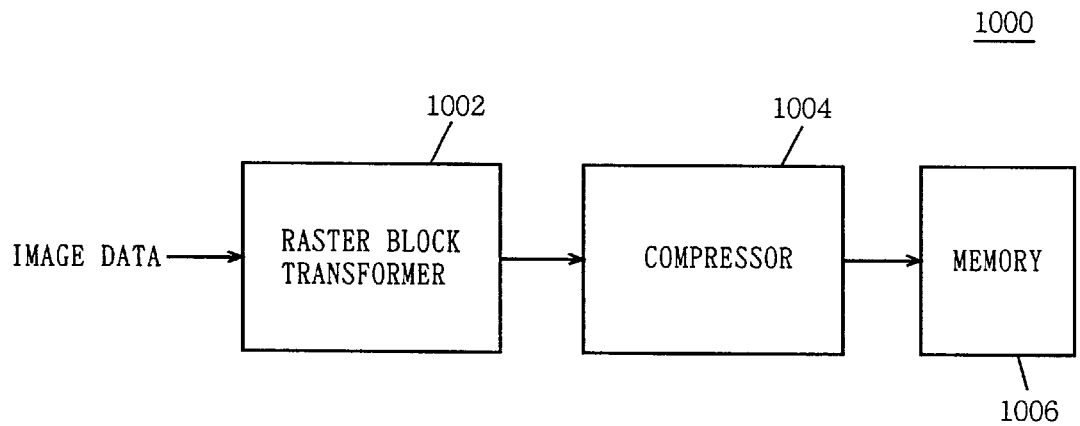
FIG. 46 is a schematic block diagram showing a structure of a conventional image compression apparatus 1000.
Figure 48:
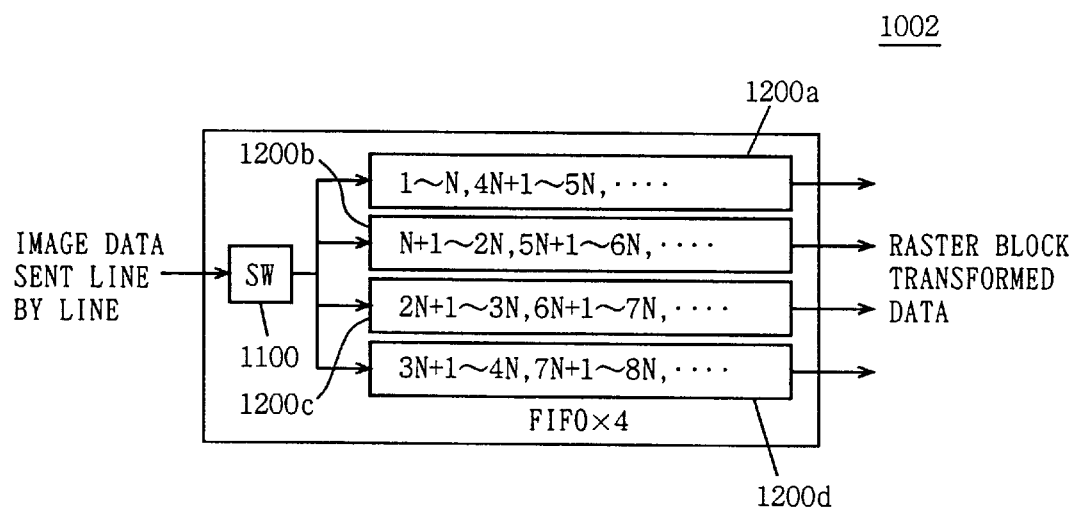
FIG. 48 is a schematic block diagram showing a structure of a raster•block transformer 1002.
Figure 49:
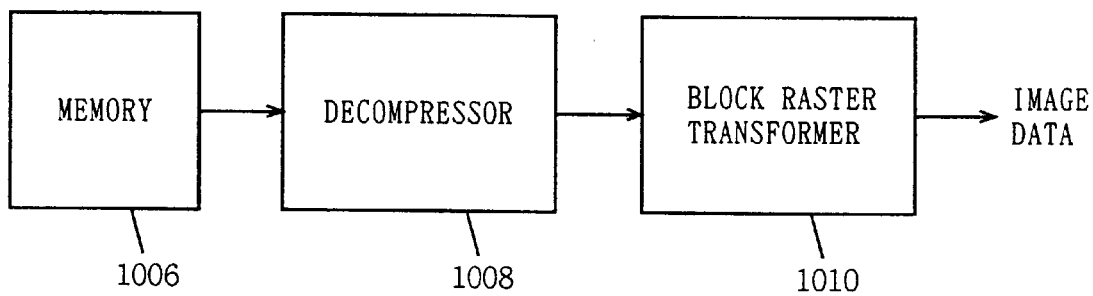
FIG. 49 is a schematic block diagram showing a structure of a conventional image decompression apparatus 2000.
Figure 51:
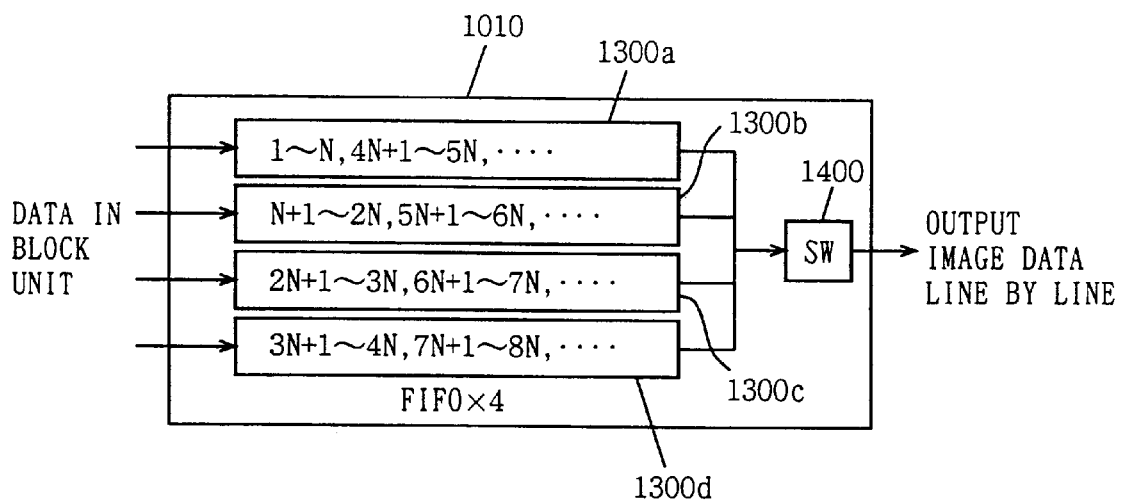
FIG. 51 is a schematic block diagram showing a structure of a block•raster transformer 1010.

FIG. 45 is a flow chart showing the flow of image decompression described with reference to FIGS. 37 to 44.

When the image decompression starts (step S600), image decompression apparatus 400 initializes the value of variable i which corresponds to the line number to be output to 1 (step S602), and thereafter initializes the value of variable n corresponding to the column number of the block for designating the memory region to be read of memory 104 to 0 (step S604) under the control of control circuit 108.

Thereafter, control circuit 108 calculates the row number of the block from which the data is to be read of memory 104 in accordance with the equation (9) (step S606), and thereafter calculates the row number r of the block corresponding to the line to be output in accordance with the equation (10) (step S608).

Thereafter, control circuit 108 compares the value of variable m and the maximum number Mb of the blocks in the row direction (step S610), and when the variable m is not smaller than Mb, terminates the process (step S624).

Meanwhile, when the variable m is smaller than Mb, the process proceeds to the next step S612.

Thereafter, decompressor 124 performs fixed length code data decompression of the designated block (m, n) (step S612).

Thereafter, data extraction circuit 126 extracts the data of the forth row of the block (m, n) (step S614) and externally outputs (step S616).

Thereafter, the value of variable n designating the block for reading data from memory 104 is incremented by 1 (step S618).

Thereafter, the value of the variable n is compared with the number of blocks Nb in the column direction, and when the variable n is smaller than the number Nb of the blocks in the column direction, the process returns to step S606.

Meanwhile, when the value of the variable n is not smaller than the number Nb in the column direction of the blocks, the value of the variable i is incremented by 1 (step S622) and the process returns to step S604.

By the above described process, when the original image data is divided into blocks of N columns and M rows and subjected to fixed length code data compression block by block, the decoded image data corresponding to the original image data can be externally output line by line based on the data compressed in the above described manner. Therefore, it becomes unnecessary to perform block•raster transformation in image decompression, and therefore a method of image decompression which allows simple processing and lower cost is provided.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. An image processing apparatus in which image data is divided into Mb×Nb blocks arranged in Mb rows and Nb columns, each block having p×p pixels, and fixed length code data compression is performed on each said block (where p, Mb and Nb are positive integers), comprising:

control means for controlling image compression by said image processing apparatus;

data compression means receiving first data of p pixels corresponding to one row of said block out of said image data successively applied externally line by line, and second data applied under the control of said control means, for performing fixed length code data compression on data obtained by integrating the first data with the second data;

storing means receiving an output from said data compression means for storing, in accordance with which of said blocks the compressed data belongs to, the output in one of memory regions allotted corresponding to respective ones of said Mb×Nb blocks; and data decompression means controlled by said control means for receiving, in accordance with which of said blocks the first data to be input to said data compression means belongs to, the data which has been subjected to fixed length code data compression and stored in a corresponding one of said memory regions of said storing means, and for performing fixed length code data decompression and applying the result as said second data to said data compression means.

2. The image processing apparatus according to claim 1, wherein said data compression means receives said first data corresponding to p pixels of said image data externally applied line by line successively and said second data corresponding to p×q pixels (q: integer, $0 \leq q \leq p-1$) applied controlled by said control means, for performing fixed length code data compression on data of p×(q+1) pixels;

said data decompression means, controlled by said control means, receives, according to which of said blocks the data of p pixels among the image data input line by line to said data compression means belongs to, the data stored in the corresponding memory region of said storing means, and applies data of said p×q pixels which are the result of fixed code data decompression, to said data compression means; and i) when said externally applied image data is of (p×m+1)th line (m: integer, $0 \leq m \leq Mb-1$), said control means applies data of p pixels included in the block of nth column (n: integer, $0 \leq n \leq Nb-1$) among said image data of (p×m+1)th line to said data compression means and stores compressed data in a memory region which corresponds to the block of m rows and n columns successively of said storing means, and ii) when said externally applied image data is of the (p×m+r)th line (r: integer, $2 \leq r \leq p$), said control means applies data of p pixels included in the block of nth column among said image data of the (p×m+r)th line and data of p×q (q=r-1) obtained from said data decompression means by decompressing data stored in the memory region corresponding to the block of m rows and n columns to said data compression means, and stores the data compressed at every p×(q+1) pixels, in a memory region corresponding to the block of m rows and n columns successively in said storing means.

3. The image processing apparatus according to claim 1, further comprising switching means receiving said image data externally applied line by line successively, controlled by said control means for applying the received data either to said data compression means or said storing means; wherein said data compression means receives said first data of p pixels out of said image data applied from said switching means and said second data of p×q pixels (q: integer, $0 \leq q \leq p-1$) applied controlled by said control means, and performs fixed length code data compression on the data of p×(q+1) pixels;

said data decompression means, controlled by said control means, receives, according to which of said blocks the data of p pixels among the image data input line by line to said data compression means belongs to, data stored in the corresponding memory region of said storing means, and applies data of said p×q pixels, which are result of fixed length code data decompression, to said data compression means; and i) when said externally applied data is of the (p×m+s)th line (m, s: integer, 0≦m≦Mb−1: 1≦s≦sm<p:sm is a prescribed integer), said control means controls said switching means so that said external image data is applied to said storing means and stores the image data in corresponding memory regions corresponding to the blocks of m rows and n columns in said storing means up to p×sm pixels on block by block basis for blocks of m rows and n columns (n: integer, 0≦n≦Nb−1), ii) when said externally applied image data is of the (p×m+sm+1)th line, said control means integrates data of p pixels included in the block of nth column of image data of said (p×m+sm+1)th line and data of p×sm pixels stored in the corresponding memory region of the block of m rows and n columns and performs fixed length code data compression on the integrated data, and stores the data obtained by compression of data of p×(sm+1) pixels in the memory region corresponding to the block of m rows and n columns in said storing means, and iii) when said externally applied image data is of the (p×m+r)th line (r: integer, sm+2≦r≦p), said control means applies data of p pixels included in the block of nth column among the image data of said (p×m+r)th line, and data of p×q (q=r−1) pixels obtained from said data decompression means by decompressing the data stored in the memory region corresponding to the block of m rows and n columns, to said data compression means, and stores the data compressed at every p×(q+1) pixels, successively in the memory region corresponding to the block of m rows and n columns in said storing means.

4. An image processing apparatus in which image data is divided into Mb×Nb blocks arranged in Mb rows and Nb columns, each block having p×p pixels, fixed length code data compression is performed on each said block and thus obtained data is decompressed and output line by line of said image data (where p, Mb and Nb are positive integers), comprising:

control means for controlling image data decompression of said image processing apparatus;

storing means for storing, according to which of said blocks the data compressed for each row including data of p pixels in each block belongs to, the data in one of memory regions allotted corresponding to respective ones of said Mb×Nb blocks; and data reading means controlled by said control means for reading data stored in said storing means and output said image data line by line by successively scanning memory regions corresponding to said blocks along the row direction of said blocks and performing fixed length code data decompression to successively output each line of said image data.

5. The image processing apparatus according to claim 4, wherein said data reading means includes data extracting means controlled by said control means for successively selecting and reading compressed data included in one line of said image data out of the compressed data stored in said storing means, and data decompression means controlled by said control means, receiving an output from said data extraction means for successively performing fixed length code data decompression on data of every p pixels.

6. The image processing apparatus according to claim 4, wherein said data reading means includes data decompression means controlled by said control means for successively performing fixed length code data decompression block by block on compressed data corresponding to the block to which data of p pixels included in one line of said image data belongs to, out of the compressed data stored in said storing means, and for outputting the decompressed data, and data extracting means controlled by said control means and receiving an output from said data decompression means, for successively selecting and outputting data of p pixels belonging to one line of said image data.

* * * * *